US010298692B2

(12) United States Patent
Lauer

(10) Patent No.: US 10,298,692 B2
(45) Date of Patent: *May 21, 2019

(54) SYSTEMS AND METHODS FOR AVERTING UNSANCTIONED ACCESS TO ON-BOARD VEHICLE NETWORKS

(71) Applicant: GOGO LLC, Chicago, IL (US)

(72) Inventor: Bryan Adrian Lauer, Hinckley, IL (US)

(73) Assignee: GOGO LLC, Chicago, IL (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/170,649

(22) Filed: Jun. 1, 2016

(65) Prior Publication Data

US 2017/0353555 A1 Dec. 7, 2017

(51) Int. Cl.
*G06F 21/36* (2013.01)
*H04L 29/08* (2006.01)
(Continued)

(52) U.S. Cl.
CPC .............. *H04L 67/12* (2013.01); *G06F 21/36* (2013.01); *H04L 63/107* (2013.01);
(Continued)

(58) Field of Classification Search
None
See application file for complete search history.

(56) References Cited

U.S. PATENT DOCUMENTS 8,122,384 B2 2/2012 Partridge et al.
8,217,800 B2 7/2012 Vander Veen et al.
(Continued)

FOREIGN PATENT DOCUMENTS

CN 2919774 Y 7/2007
DE 102013221504 A1 4/2015
(Continued)

OTHER PUBLICATIONS

"Elevator", Wikipedia, 2013, http://en.wikipedia.org/w/index.php?title=Elevator&oldid=540929841, 31 pages.
(Continued)

*Primary Examiner* — Fatoumata Traore
(74) *Attorney, Agent, or Firm* — Marshall, Gerstein & Borun LLP; Randall G. Rueth

(57) ABSTRACT

Novel techniques for averting unsanctioned access to on-board vehicle networks include obtaining indications of detected stimuli and/or conditions that are external to a target computing device, and determining whether or not the detected stimuli/conditions are indicative of the target computing device being utilized, operated, held, and/or carried by a person on-board the vehicle. External stimuli/conditions may include signals transmitted by other devices on-board the vehicle, ad-hoc data received via various interfaces of the target computing device, comparisons of vehicle heuristic data with data generated by components of the target computing device, etc. A confidence score may be generated (e.g., over time) based on detected stimuli/conditions. Access of the target computing device to an on-board vehicle network may be granted or denied based on the detected stimuli/conditions and/or the confidence score. Further, the novel techniques are not required to use any user input.

16 Claims, 6 Drawing Sheets

(51) Int. Cl.
| | |
|---|---|
| *H04L 29/06* | (2006.01) |
| *H04W 4/02* | (2018.01) |
| *H04W 4/48* | (2018.01) |
| *H04W 12/08* | (2009.01) |
| *H04W 4/021* | (2018.01) |

(52) U.S. Cl.
CPC .............. *H04W 4/027* (2013.01); *H04W 4/48* (2018.02); *H04W 12/08* (2013.01); *H04W 4/021* (2013.01)

(56) References Cited

U.S. PATENT DOCUMENTS

| | | | |
|---|---|---|---|
| 9,088,613 B2 | 7/2015 | Wahler | |
| 9,147,065 B2 | 9/2015 | Lauer | |
| 9,348,492 B1* | 5/2016 | Penilla | B60W 40/08 |
| 2004/0209594 A1* | 10/2004 | Naboulsi | B60R 11/0264 |
| | | | 455/404.1 |
| 2007/0072553 A1* | 3/2007 | Barbera | H04M 1/72577 |
| | | | 455/67.11 |
| 2010/0201478 A1* | 8/2010 | Veen | G06F 21/36 |
| | | | 340/3.1 |
| 2010/0229223 A1 | 9/2010 | Shepard et al. | |
| 2011/0150267 A1 | 6/2011 | Snelling et al. | |
| 2012/0220276 A1* | 8/2012 | Kobylarz | H04W 4/00 |
| | | | 455/414.1 |
| 2012/0254940 A1 | 10/2012 | Raper | |
| 2012/0265372 A1 | 10/2012 | Hedrick | |
| 2014/0136658 A1 | 5/2014 | Wahler | |
| 2014/0310739 A1* | 10/2014 | Ricci | H04W 4/21 |
| | | | 725/28 |

FOREIGN PATENT DOCUMENTS

| | | |
|---|---|---|
| EP | 2339497 A2 | 6/2011 |
| EP | 3002966 A1 | 4/2016 |
| WO | WO-2013/181310 A2 | 12/2013 |
| WO | WO-2014/142947 A1 | 9/2014 |

OTHER PUBLICATIONS

Conti et al., Mind how you answer me!, Information, Computer and Communications Security, 249-259(2011).

David B. Smith, "High Level System and Tactical Requirements, Air-to-Ground Broadband Service, DRAFT", Operation Technology Division of the Federal Bureau of Investigation, Section 3.13 (2010).

International Search Report and Written Opinion in PCT/US2014/013975, dated May 9, 2014.

Platzer, C., Sequence-based bot detection in massive multiplayer online games, Information, Communications and Signal Processing (ICICS), 1-5(2011).

Thorpe et al., Pass-thoughts: authenticating with our minds, International Association for Cryptologic Research, vol. 20050421:233346, 1-14(2005).

U.S. Appl. No. 15/092,844, Systems and Methods for On-Board Access Control, filed Apr. 7, 2016.

U.S. Appl. No. 15/092,884, Systems and Methods for Authenticating Applications to On-Board Services, filed Apr. 7, 2016.

International Search Report and Written Opinion, International Application No. PCT/US2017/028477, dated Jul. 26, 2017.

* cited by examiner

SYSTEMS AND METHODS FOR AVERTING UNSANCTIONED ACCESS TO ON-BOARD VEHICLE NETWORKS

CROSS-REFERENCE TO RELATED APPLICATIONS

The present application is related to U.S. patent application Ser. No. 13/781,841 entitled "Determining Human Stimuli at Computing Devices and issued as U.S. Pat. No. 9,147,065, the disclosure of which is hereby incorporated by reference herein in its entirety.

FIELD OF THE DISCLOSURE

Technical Field

The instant disclosure generally relates to averting or preventing unsanctioned access of computing devices to networks that are on-board vehicles. More particularly, the instant disclosure generally relates to determining whether or not conditions that are detected at a computing device that is on-board a vehicle are consistent with the computing device being operated by a person, and granting or denying the computing device access to an on-board network based on the determination.

Background

People are able to bring their personal computing or electronic devices (e.g., cell phone, laptop, e-reader, tablet, smart device, etc.) on-board a vehicle and utilize their devices to access on-board communications networks while the vehicle is in transit. For example, a person may utilize their laptop or smart phone to access a wireless network on-board an aircraft during flight to communicatively connect to other devices on-board the aircraft, to other devices on the ground, to the Internet, to other ground-based networks, etc., and/or to access various services and applications. The on-board communications network is typically provided by a vehicle-based communication service provider (e.g., an aircraft-based wireless Internet service provider), and may or may not be a secured network. As is commonly known, access to secured networks typically requires a computing device to provide a network key, passcode, or password before the device may connect to the network. While a network key, passcode, or password may be initially entered by a person, the key, passcode, or password may be locally saved at the computing device for future automatic accesses or connections of the device. Alternatively, an automated password decoder may be utilized by a computing device to automatically determine a network key, passcode, or password of a network, and thereby automatically connect to the network.

For ease of discussion herein, an entity that provides and/or operates at least a portion of one or more on-board communications networks, and that provides and/or operates communications services and connectivity for the public's personal computing devices via the one or more on-board communications networks is generally referred to herein as a "service provider" or an "on-board service provider." For example, an on-board service provider may be an airline (or another company that is contracted by an airline) that provides in-flight communications services to passengers. The on-board communications networks provided by on-board service providers are referred to herein as "public" on-board networks, as any member of the public may utilize his or her computing device to access the on-board network so long as certain criteria are met, such as providing the network key, agreeing to conditions and terms, paying for the use of the network and/or for services provided by the network, etc. A "user," as generally used herein, refers to a person who operates, utilizes, carries, holds, or otherwise interacts with a computing device, such as a passenger, crew member, or other human being. For example, a user may purchase or otherwise receive services from an on-board service provider (e.g., in-flight communication services, entertainment services, etc.), and may utilize his or her personal device to access those services via the on-board network while he or she is on-board the vehicle.

In the United States of America, in the interest of public safety, the Federal Bureau of Investigation (FBI) has issued technical requirements for vehicle-based communication services providers. These technical requirements are aimed at preventing or averting unauthorized or unsanctioned access of computing devices to on-board communications networks for nefarious purposes. Specifically, the technical requirements stipulate, inter alia, that vehicle-based communication service providers are to not allow automated access of public computing devices (e.g., computing devices owned and/or operated by members of the public) to their on-board communications networks. For example, a computing device stowed in a suitcase in the cargo hold of an aircraft should be prevented from automatically accessing the public on-board communications network, and thus would be prevented from using the on-board network to obtain and/or change critical flight data, disable aircraft electronics, infiltrate other devices on the network, respond to a trigger or message from another device (e.g., a device that is on the ground) to initiate an undesirable or catastrophic action such as detonating an explosive device, etc. Accordingly, an objective of the technical requirements is to grant on-board communications network access to only those computing devices that are presently being operated by a person on-board the vehicle.

A method suggested by the FBI to meet its technical requirements is to require public computing devices that are on-board-vehicles to pass a visual or external challenge-response test in order to be granted access to on-board communications networks. These challenge-response tests are generally easy for a computer to generate and easy for a human to solve, but are difficult for computers to solve. One such commonly used test is a CAPTCHA (Completely Automated Public Turing test to tell Computers and Humans Apart), which typically is a series of alphanumeric symbols or other symbols that are commonly found on a keyboard, key pad, or equivalent user interface of a computing device. The symbols are distorted, warped, or otherwise disfigured when presented, but remain generally legible to humans. In a typical visual challenge-response test, a computing device generates a CAPTCHA phrase and presents the CAPTCHA phrase on a display. A person or human views the distorted image and enters the displayed symbols via the keyboard, key pad, or equivalent. Accordingly, a response to the challenge is said to be "externally" provided, e.g., the response provided by an entity external to the computing device. Examples of prior art CAPTCHA displays are illustrated in FIGS. 1A and 1B. FIG. 1A shows two series of warped alphabetic characters that are each overlaid with an angled line, and FIG. 1B shows three series of warped alphanumeric characters in which the symbols are crowded together. Pictorial CAPTCHAs are also known and used, e.g., those that require a person to select, from a set of displayed images, only those images that include a particular object such as a street sign or a flower. If a mostly correct, external response to an issued challenge is received at the computing device, the presumption is that the computing device is presently being operated by person or human and, accordingly, the computing device would be granted access to an on-board communications network.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a method of averting or preventing unsanctioned access to a network that is on-board a vehicle may include detecting, at a computing device that is on-board the vehicle, one or more externally generated stimuli or conditions, where the one or more externally generated stimuli or conditions excludes a response to a challenge issued at a user interface of the computing device. The method may further include determining whether or not the one or more externally generated stimuli or conditions are contextual to the vehicle and indicative of the computing device being utilized by one or more persons who are on-board the vehicle. Additionally, the method may include granting access of the computing device to the on-board network, where the granting is based on a determination that the one or more externally generated stimuli or conditions are contextual to the vehicle and indicative of the computing device being utilized by one or more persons who are on-board the vehicle.

In an embodiment, a system for averting or preventing unsanctioned access to a network on-board a vehicle includes means for detecting one or more stimuli or conditions that are external to a computing device that is on-board the vehicle, where the one or more externally generated stimuli or conditions exclude a response to a challenge issued at a user interface of the computing device. The system may also include means for determining whether or not the one or more externally generated stimuli or conditions are contextual to the vehicle and are indicative of the computing device being utilized by one or more persons who are on-board the vehicle. Further, the system may include means for granting access of the computing device to the on-board network, the granting based on a determination that the one or more externally generated stimuli or conditions are contextual to the vehicle and indicative of the computing device being utilized by one or more persons who are on-board the vehicle.

In an embodiment, a system for averting or preventing unsanctioned access to a network on-board a vehicle may include a detection engine that is communicatively coupled to one or more components of a computing device that is on-board the vehicle and that is configured to detect, via the coupling to the one or more components, one or more stimuli or conditions that are external to the computing device. The system may also include a determination engine that is coupled to the detection engine and that is configured to determine, based on the one or more stimuli or conditions detected by the detection engine, whether or not the computing device is being utilized by one or more persons who are on-board the vehicle. A grant or a denial of access of the computing device to the on-board network may be based on a determination of the determination engine as to whether or not the computing device is being utilized by one or more persons on-board the vehicle.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figures 1A, 1B:
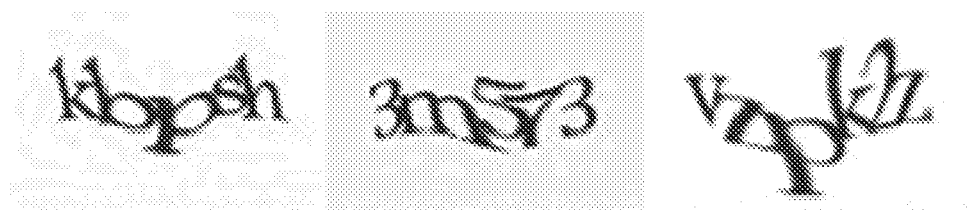
FIGS. 1A and 1B show examples of prior art CAPTCHAs used to determine whether or not a human being is interacting with a target computing device.

As discussed above, the method suggested by the FBI to meet its technical requirements of not allowing automated access of computing or electronic devices to on-board public networks is to require that computing or electronic devices pass a visual or external challenge-response test, e.g., a CAPTCHA, which may take an alphanumeric, symbolic, and/or pictorial form. A challenge such as a CAPTCHA may be presented or issued at a user interface of a target computing or electronic device, and if a mostly correct response to the challenge is received at the target computing device, the presumption is that the computing device is presently being operated by person or human being. Accordingly, the computing device would be granted access to an on-board network. Examples of CAPTCHAs and valid responses are provided in FIGS. 1A-1B, and also are described in aforementioned U.S. Pat. No. 9,147,065.

However, the visual or external challenge-response method suggested by the FBI is not intuitive for users and causes a barrier to service for people (e.g., the public) who are on-board vehicles. For example, challenge-response tests such as CAPTCHAs are typically issued via a web browser at target computing devices. Yet, if a passenger does not launch a web browser, and instead launches an application on his or her device that does not require the use of a web browser but does require the use of the on-board network, the passenger is prevented from utilizing the application without knowing why. The passenger must somehow come to the realization that he or she needs to open up a browser in order to be redirected to the challenge-response webpage in order to be granted access to the on-board network. One possible solution is to issue an on-board network-related challenge-response test within each application, however, as the number of possible applications that may be loaded onto a passenger's device is unwieldy (and nowadays, approaching infinite), it is not realistic for an on-board network provider to have its challenge-response test embedded into every application that may possibly be loaded onto a passenger's device.

On the other hand, the novel techniques, systems, and methods disclosed herein leverage the components, functionality, and/or user interfaces of a computing device (e.g., a "target" computing device) and of other devices that are on-board a vehicle to avert or prevent unauthorized and/or unsanctioned access of the computing device to an on-board network, at least in part by automatically determining whether or not a human is holding, carrying, interacting with, utilizing, and/or otherwise operating the target computing device. Access to an on-board network and/or to one or more services and/or applications may be automatically granted if conditions that are consistent with the target computing device being operated, utilized, or held/carried by a person are detected or otherwise determined. Importantly, the novel techniques, systems, and methods may be performed without the knowledge of a passenger or user of the target computing device. As such, the computing or electronic device of the passenger is not only able to meet the FBI's tactical requirements, but does so in a manner that is transparent to the passenger or user. Indeed, the passenger or user may not even be aware that his or her device has been automatically vetted for on-board network access. Consequently, the novel techniques, systems, and methods disclosed herein not only are able to avert or prevent unsanctioned access of devices to communications networks that are on-board vehicles to increase the safety and security of the people who are on-board the vehicle, but are also able to do so in a manner that preserves a satisfactory user experience.

In some embodiments, the target computing device may be a mobile electronic device such as a smart device, a phone, a tablet computing device, an electronic reading device, a laptop computer, or other portable, mobile device having a memory, a processor and a wireless interface. In some embodiments, the target computing device may be a stationary computing device such as a desktop computing device, a server, or other computing device that generally is not ported to different locations. For ease of discussion, the techniques, systems, and methods are described herein with reference to mobile computing devices, however, the techniques, systems and methods are equally applicable to computing devices that remain essentially stationary. Generally, the target computing device to which the novel techniques, systems, and methods disclosed herein are applied is a public computing device, e.g., one that is owned and/or operated by a passenger or other member of the public, although the novel techniques, systems, and methods discussed herein are equally applicable to other computing and/or electronic devices.

Additionally, although the present disclosure at times refers to a "vehicle" as being an airplane or aircraft, this is only exemplary and for ease of discussion only, and is not meant to be limiting. Indeed, the techniques described herein may easily be applied to other vehicles, e.g., other types of aircraft, ships, trains, cars, buses, or any other type of vehicle that has the ability move through the air, on the ground, through space, or on water.

Figure 2:
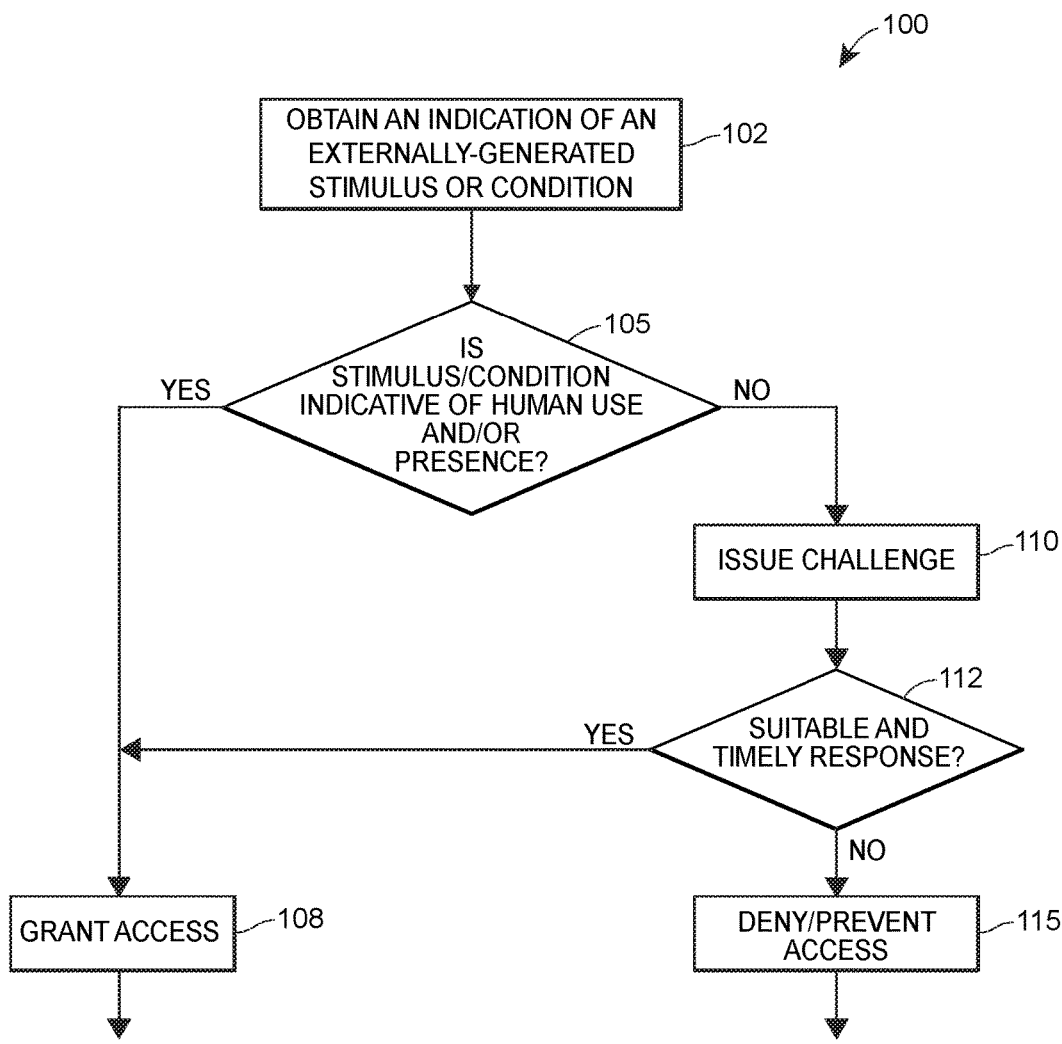
FIG. 2 depicts a flow diagram of an example method for averting, preventing, and/or mitigating unauthorized or unsanctioned access of a computing or electronic device to a network that is on-board a vehicle.

FIG. 2 is a flow diagram of an example method 100 for averting, preventing, and/or mitigating unauthorized or unsanctioned access to a communications network that is on-board a vehicle. The method 100 may be used to grant or deny access to the on-board communications network for a target computing device that is on-board the vehicle. The method 100 may be performed locally at the target computing device, or the method 100 may be performed by a computing device that is remote to the target computing device (a server, peer device, or other computing device) and that is in communication with the target computing device. In some embodiments, the target computing device may perform at least a portion of the method 100, and the remote computing device with which the target computing device is in communication may perform at least a portion of the method 100. The on-board communications network may be a public or publicly-accessible network, e.g., a network that any member of the public may access via his or her computing or electronic device so long as certain criteria are met such as providing the appropriate network key, agreeing to conditions and terms, paying for the use of the network and/or for services provided by the network, etc. Further, the on-board communications network may be secured or unsecured. Accordingly, while the method 100 below is discussed from the perspective of a target computing device, this is for the purposes of ease of discussion and only one of many embodiments. For example, in other embodiments, one or more of the blocks of the method 100 may be executed by a remote computing device that is on-board the vehicle. For example, a server or computing device of an on-board communications network may execute one or more of the blocks of the method 100. In an embodiment, the server or computing device of the on-board communications network may execute all blocks of the method 100.

At any rate, at a block 102, the method 100 may include detecting, at a target computing device that is on-board a vehicle, one or more externally generated stimuli and/or external conditions. For example, the target computing device may obtain an indication indicative of an occurrence of an externally generated stimuli or an external condition. An externally generated stimulus or external condition may be, for example, an action or activity whose object of action or activity is at least some part or component of the target computing device, an action or activity whose result affects at least some part or component of the target computing device, and/or an action or activity that is detected or otherwise observed by the target computing device. As such, an externally generated stimulus or external condition may be a stimulus or condition that is neither generated nor originated by any part or component of the target computing device, and instead is generated or originated by one or more separate entities other than the target computing device. The separate entities that generate the stimuli and/or condition may include, for example, a human being or person and/or another device that is on-board the vehicle. In an embodiment, the separate entity that generates or originates a stimuli or condition may be a device that is fixedly connected to the vehicle, as is described in a later section.

The detected, externally generated stimulus or external condition (block 102) may be independent of (e.g., may not include or may exclude) a user's response to a previously issued challenge (e.g., a CAPTCHA or CAPTCHA-like challenge) at the target computing device. For example, the detected stimulus or condition is not an attempt to recreate, reproduce or enter an ordered series of ASCII-printable characters that has been previously presented on the user interface or other user response to an issued challenge. Rather, the detected stimulus or condition (block 102) may be another type of externally generated stimulus or external condition that is detected or observed by one or more components of the target computing device. In an embodiment, the externally generated stimulus or external condition may be an ad-hoc stimulus or condition that is generated or originated independently of any challenge, e.g., that is not a response to a previously issued challenge. For example, the stimulus or condition may be generated or caused by a user of the target computing device, although not in response to an issued challenge. In an embodiment, the ad-hoc, externally generated stimulus or condition may be generated or caused by another device that is on-board the vehicle.

Referring now to block 105, the method 100 includes determining if the detected, externally generated stimuli or external conditions are contextual to the vehicle and are indicative of the target computing device being utilized, operated, held, and/or carried by one or more persons who are on-board the vehicle. Such determinations may be particularly based on the type(s) of external stimuli or external conditions that have been detected (block 102), as is discussed in more detail in a later section.

If the detected, externally generated stimuli or external conditions are determined to be contextual to the vehicle and indicative of the target computing device being utilized, operated, held, and/or carried by one or more persons on-board the vehicle (e.g., the "yes" branch of block 105), the target computing device may be granted or allowed at least partial access to the on-board network (block 108). On the other hand, if the detected externally generated stimuli or external conditions are determined to be indicative of the target computing device not being utilized, operated, held, and/or carried by one or more persons on-board the vehicle (e.g., the "no" branch of block 105), a challenge such as a CAPTCHA may be issued (block 110) at a user interface of the target computing device. If a suitable response to the challenge is received at the target computing device within a predetermined amount of time (e.g., the "yes" branch of block 112), the target computing device may be granted or allowed access to the on-board network (block 108). If an unsuitable response to the challenge is received at the target computing device, or if no response is received within the predetermined amount of time (e.g., the "no" branch of block 112), the target computing device may be denied access to and/or prevented from accessing the on-board communications network (block 115). As such, the blocks 102 and 105 of the method 100 may serve as an initial evaluation as to whether or not a target computing device is being held, carried, utilized, and/or otherwise operated by a person, and the challenge-response test corresponding to the blocks 110 and 112 may serve as a back-up evaluation as to whether or not a target computing device is being held, carried, utilized, and/or otherwise operated by a person. For example, if a passenger places his or her computing device on a tray table and falls asleep, he or she may still be able to later access the on-board communications network (e.g., via the blocks 110, 112) even though the device has not actively been operated on and/or moved for some time.

In some embodiments of the method 100, though, the blocks 110-112 may be omitted. In these embodiments, if the detected externally generated stimuli or external conditions are determined as being indicative of the target computing device not being utilized, operated, held, and/or carried by one or more persons on-board the vehicle (e.g., the "no" branch of block 105), then the target computing device may be automatically denied access to the on-board network (block 115) without any intervening challenge-response test or back-up evaluation.

It is noted that in the method 100, the blocks 102-105 corresponding to the initial evaluation as to whether or not the target computing device is being utilized, operated, held and/or carried by a person on-board the aircraft may be performed without using or requiring any user input. For example, the blocks 102-105 may be automatically performed upon initialization of the target computing device or of an application thereon. In another example, the blocks 102-105 may automatically performed upon the target computing device detecting the presence of the on-board communications network (e.g., detecting a signal generated by a transceiver of the on-board network). Indeed, a user of the target computing device may not be presented with any indication that the blocks 102-105 are being performed, and as such may be ignorant of the execution of the blocks 102-105. Consequently, at least a portion (if not all) of external stimuli/condition detection and evaluation of whether or not a target computing device is being utilized and/or operated by a person on-board the vehicle may be transparent to the user, thus providing a seamless, convenient, and satisfactory user experience.

Several examples to illustrate at least some of the concepts and techniques of the method 100 are provided below. It is understood that these examples are not limiting, but are merely a few of numerous use cases to which the method 100 may be applied.

In an embodiment, the one or more externally generated stimuli or external conditions that are detected by the target computing device (block 102) may comprise one or more signals that are detected by the target computing device. The one or more signals may be generated by one or more transmitters or transceivers that are on-board the vehicle and that may be fixedly connected to the vehicle. For example, an on-board Wi-Fi access point may generate a beacon or other wireless signal that is detected by the target computing device. Aspects of Wi-Fi access point-generated signals (e.g., an identifier of the on-board network such as the SSID (Service Set Identifier) included in the signals, the signal strength, etc.) may be examined used to determine whether or not the target computing device is contextual to/on-board the aircraft (block 105). For example, a particular SSID for non-board network corresponding to a particular flight may be known a priori by the target computing device. If the SSID generated by the access point and detected by the target computing device matches the particular SSID known a priori to the target computing device, then the target computing device may be assumed to be on-board the vehicle.

Additionally or alternatively, wireless signals generated by other types of transmitters or transceivers on-board the aircraft (e.g., cellular or picocell transceivers, Bluetooth® or other short-range wireless transceivers, Near-Field Communication (NFC) transceivers, etc.) may be detected (block 102), and their respective signals may be examined (block 105) to ascertain whether or not the target computing device is contextual to/on-board the vehicle. For example, the detection of a presence, identity, and/or contents of a particular Bluetooth or other type of beacon may indicate that the target computing device is on-board the vehicle. For instance, a beacon or other wireless signal generated by an on-board transceiver or transmitter may continually transmit the flight number, the origination airport code, the destination airport code, the tale number of the aircraft, and/or other data indicative of the physical aircraft and/or its particular flight, journey, or travel path. The matching of the vehicle and/or travel information transmitted by the on-board transceiver to vehicle and/or travel information known a priori to the target computing device may indicate that the target computing device is located on the intended vehicle for the intended journey and/or travel path.

In an embodiment, a characteristic of one or more wireless signals detected at the target computing device may indicate whether or not the target computing device is not only on-board the vehicle, but may also indicate whether or not the target computing device is being held, carried, utilized, or otherwise operated by a person. For example, the perceived or detected strength of a signal transmitted by a Wi-Fi access point transmitting within the cabin of an aircraft will be stronger for a device located within the cabin of the aircraft and weaker for a device located within the cargo hold of an aircraft. Consequently, if the strength of a detected wireless signal is above a particular threshold, a target computing device may be considered to be located within the aircraft cabin (and not in the hold), and therefore being operated or utilized by a person. In another example, respective strengths of respective signals generated by two or more access points may be triangulated or otherwise compared with respect to one another to determine whether or not the target computing device is disposed within the cabin of the aircraft.

In some situations, wireless signals that are generated by transmitters or transceivers on-board the aircraft may be detected and examined over time to ascertain whether or not the target computing device is being held, carried, utilized, and/or otherwise operated by a person. For example, as a person walks down the aisle of an airplane with his or her device, his or her device may first detect access point A, and subsequently may detect wireless access point B. The sequential detection of said wireless access points over time may indicate that the target device is moving within the cabin of the airplane, and therefore is being operated, utilized, held, and/or carried by a person.

In an embodiment, other devices that are on-board the vehicle and whose signals may be used to determine whether or not a target computing device is being held, carried, utilized, and/or otherwise operated by person on-board the vehicle (block 105) may include monitoring devices and/or sensing devices that monitor, measure, track, and/or sense dynamic characteristics and/or conditions corresponding to the vehicle as the vehicle travels or is in transit. Data corresponding to and/or indicative of these dynamic characteristics and/or conditions is generally referred to herein as "vehicle travel data" or "vehicle heuristic data." Examples of vehicle travel or heuristic data include spatial orientation of the vehicle (e.g., roll, pitch, and/or yaw), vehicle movement, vehicle location, vehicle speed, airspeed, proper acceleration, coordinate acceleration, heading, altitude, depth, and like. As such, monitoring and/or sensing devices may comprise accelerometers and/or other types of spatial oriientation detectors, meters, tubes, gauges, sensors, and/or any other suitable measurement, sensing, and/or detection devices. Typically, but not necessarily, monitoring, sensing, and/or detection devices that generate vehicle travel or heuristic data are fixedly connected to the vehicle. For example, in an aircraft, such devices may be housed in Line Replaceable Units (LRUs).

Figure 3A:
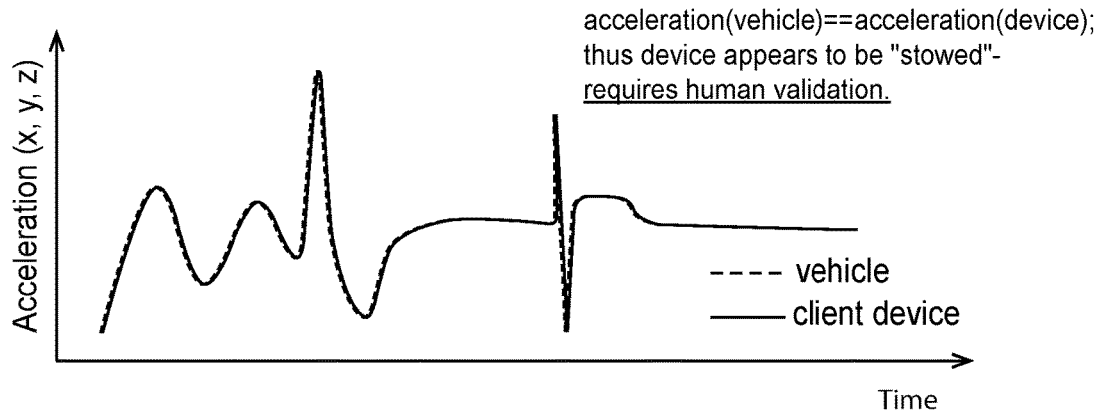
FIGS. 3A and 3B depict example comparisons of vehicle and target computing device accelerometer outputs over time.
Figure 3B:
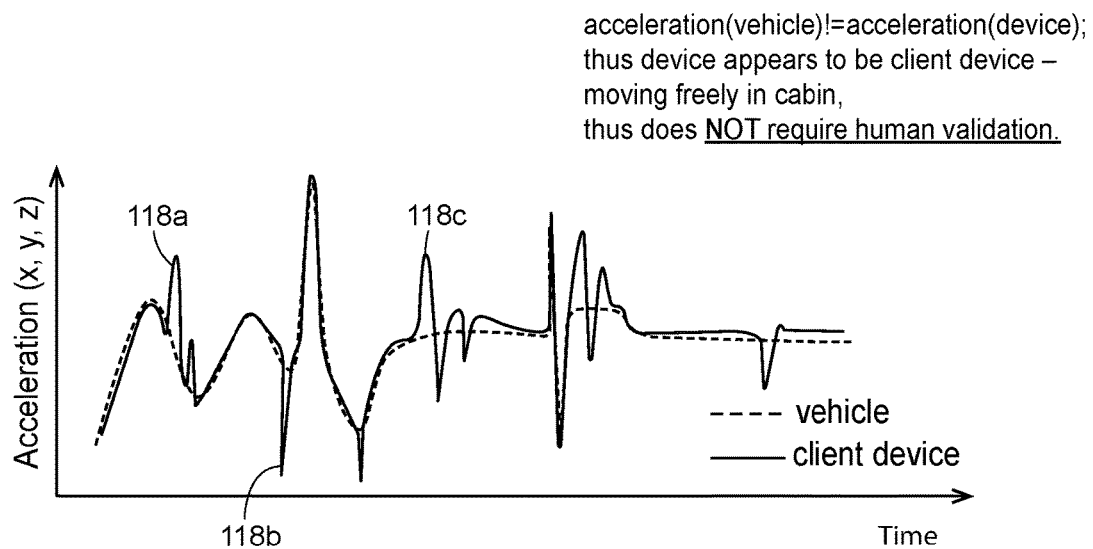

A characteristic and/or condition as determined at an on-board monitoring/sensing device may be compared with a similar characteristic and/or condition as determined at the target computing device to ascertain whether or not the target device is being operated, held, and/or carried by a person on-board the vehicle (block 105). For example, an output of an accelerometer fixedly connected to the vehicle may be compared over time with an output of an accelerometer disposed in the target computing device. If the accelerometer outputs are sufficiently similar and/or consistent in the same dimension over time, this may be an indication that the target computing device is stationary within the vehicle, and as such may not be being operated or held by a person. On the other hand, if the output of the target computing device's accelerometer differs from the output of the vehicle accelerometer in the same dimension over time, this may be an indication that a user has been manipulating, using, and/or operating the target computing device. FIGS. 3A and 3B illustrate example comparisons of vehicle and target computing device accelerometer outputs over time. In FIG. 3A, the output of the target computing device's accelerometer generally tracks with the output of the vehicle's accelerometer, and as such, the target computing device may be determined as not being operated, held or carried by a person on-board the vehicle (e.g., the "no" branch of the block 105. In contrast, in FIG. 3B, the output of the target computing device's accelerometer differs from the output of the vehicle's accelerometer at several instances over time (e.g., 118a, 118b, 118c), and as such, the target computing device may be moving freely within the cabin and assumed to be being operated, held, and/or carried by a person. As such, the target computing device may be granted access to the on-board network (block 108). Generally speaking, any vehicle data that is generated, sensed, and/or detected by one or more devices that are on-board the vehicle (and in some cases, that are fixedly connected to the vehicle) other than the target computing device may be compared (e.g., over time) with similar data that is generated, sensed, and/or detected by the target computing device. A determination of whether or not the target computing device is being held, carried, utilized, and/or otherwise operated by a person on-board the vehicle may be determined (block 105) based on the results of the comparison. Thus, vehicle travel or heuristic data may be utilized in the method 100 to determine whether or not the target computing device is being operated by a person on-board the vehicle (block 105).

In addition to or as an alternative to vehicle travel or heuristic data, certain data that is generated, sensed, detected, and/or captured via one or more interfaces of the target computing device may be indicative of the target computing device being operated, utilized, held, and/or carried by a person on-board the vehicle. For example, certain ad-hoc stimuli (e.g., stimuli that are generated in an ad-hoc manner and not in response to an explicit challenge) generated at one or more user interfaces of the target computing device may be indicative of the target computing device being operated, utilized, held, and/or carried by a person on-board the vehicle. Generally, such ad-hoc stimuli are stimuli that may be able to be detected by one or more components of the target computing device and that may be indicative of the presence of a person.

In an embodiment, the one or more components at which an ad-hoc stimulus may be detected may be components of the target computing device that are able to be directly manipulated by a human being. In a mobile computing device, for example, such components may include a keyboard; a key pad; a touch screen; a mouse; a tracking pad; a tracking ball; a plug-in connection for an SD (Secure Digital) card, a USB (Universal Serial Bus) device, an Ethernet or other network interface, a power cord, or other physical connector; a dial; a volume control; a screen brightness control; a silent mode control; a power on/off button; an eject button of a drive; a camera; a microphone; or any other component of the computing device that is able to be physically manipulated by a human being. The target computing device may infer that a human being is interacting with the target computing device when a change in state or a manipulation of any of these manipulatable components is detected. For example, a connection of an external device into a port of the target computing device, a swipe on a tracking pad or touch screen, a volume adjustment, and other such changes of state of a manipulatable component may indicate that a human being is interacting with the target computing device. As such, a change in state or a manipulation of one or more components of the target computing device may be indicative of the target computing device being operated, utilized, held, and/or carried by a person on-board the vehicle.

In an embodiment, the one or more components at which an ad-hoc stimulus may be detected at the target computing device may not require an explicit physical action to be performed by a human being, but may otherwise detect the presence of a human being. For example, a biosensor may sense, measure or detect a fingerprint, an eye scan, a temperature of a touch that is consistent with human body temperature, or some other biological parameter that may be indicative of a human being interacting with the target computing device. Thus, a positive detection at a biosensor may be indicative of the target computing device being operated, utilized, held, and/or carried by a person on-board the vehicle.

In an embodiment, one or more user interfaces may capture data indicative of the target computing device being operated, utilized, held, and/or carried by a person on-board the vehicle. For instance, while the target computing device is on-board the vehicle, a camera or other suitable optical interface of the target computing device may capture an image of the device's surroundings and/or environment. If the captured image includes physical features of the vehicle (e.g., seat backs, tray tables, windows, etc.), then the target computing device may be determined as being operated, utilized, held, and/or carried by a person on-board the vehicle. Additionally or alternatively, if a captured image includes facial or bodily features of a person, then the target computing device may be determined as being operated, utilized, held, and/or carried by a person on-board the vehicle. Still additionally or alternatively, if the contents of the captured image changes over time, than the target computing device may be determined as being operated, utilize, held, and/or carried by a person on-board the vehicle, as it is likely that the target computing device is being moved. A time stamp of the captured image may be compared with the time period during which the vehicle is in transit to ensure temporal validity of the captured image, for example.

In some embodiments, signals that are generated by devices may be measured and/or monitored over time, e.g., by a monitoring device, sensor, and/or system on-board the vehicle, to determine whether or not the devices are being held or otherwise operated by a human. For example, the pattern of payload generated by and/or received by a device (e.g., the amounts of payload that are generated and/or received over time) may be measured and/or monitored to determine whether or not the detected payload patterns are indicative of a human being operating the device. In another example, detected signal strength of transmissions generated by the device may be measured and/or monitored over time to determine whether or not the device's signal strength magnitudes and variances are indicative of a human being operating and/or holding the device.

Figure 3C:
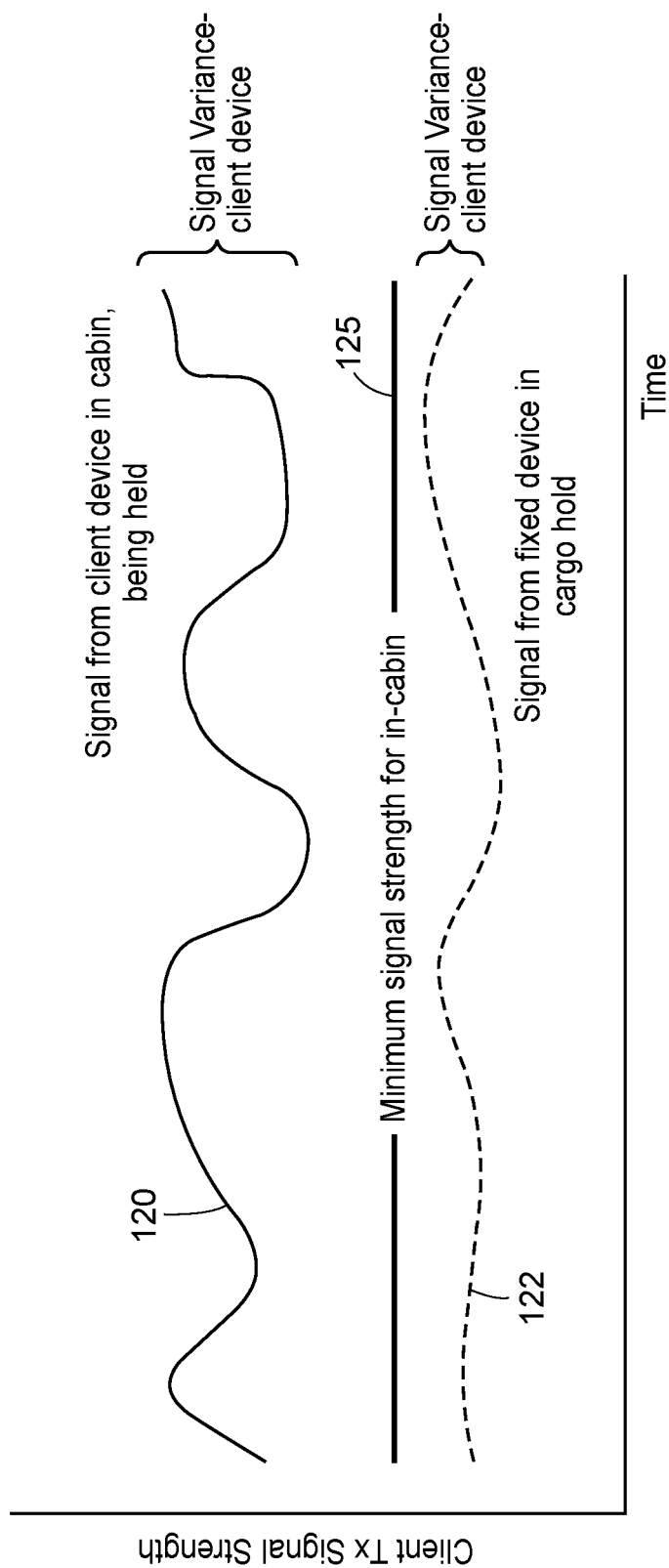
FIG. 3C depicts an example comparison over time of a signal strength of a device that is stored and a signal strength of a device that is being held or utilized by a human on-board a vehicle.

To illustrate, FIG. 3C depicts an example comparison over time between the detected signal strength of a device that is on-board the vehicle and that is being held, utilized, or operated by a person within the cabin of the vehicle (reference 120), and a detected signal strength of a device that is on-board the vehicle but that is stowed, e.g., in a cargo hold of the vehicle, and thus is not being held, utilized, or operated by a person on-board the vehicle (reference 122). The respective signal strengths may be detected, for example, by one or more transceivers that are located within the cabin of the vehicle (e.g., by Wi-Fi access points or other types of wireless transceivers and/or their respective systems), and that typically are fixedly connected to the vehicle. As shown in FIG. 3C, as a person holding the device 120 moves about the cabin over time, the detected strength of the wireless signal generated by the device varies as the person moves closer to and farther away from the transceiver(s) and/or sensor(s) disposed within the cabin. On the other hand, the detected strength of a wireless signal that is generated by a stowed device 122 has less variance over time than that of the held device 120, as the stowed device 122 is essentially stationary over time. Also as shown in FIG. 3C, the magnitude of the detected signal strength generated by the stowed device 122 typically is less than that of the held device 120, as the detected signal strength of the stowed device 122 suffers from having more inherent path loss as compared to the held device 120, e.g., due to being a greater distance away from the transceiver(s) or sensors, and/or due to materials being in the transmission path of the signal, such as flooring and seating materials. Accordingly, in some embodiments, a signal strength threshold 125 may be defined (e.g., a priori). In these embodiments, a signal strength greater than the threshold 125 may be indicative of a device that is disposed within the cabin and/or being held or otherwise operated by a person (e.g., reference 120), whereas a signal strength that is less than the threshold 125 may be indicative of a device being disposed in a location outside of the cabin such as the cargo hold (e.g., reference 122).

Returning now to block 105, in some embodiments, determining whether or not an externally generated stimulus and/or condition is indicative of a person operating, utilizing, holding, and/or carrying the target computing device may include determining a confidence score based on the externally generated stimulus/condition. A confidence score may be determined based on one or more detected or obtained externally generated stimuli and/or conditions to determine a probability or confidence level of the target computing device being operated, utilized, held, and/or carried by a person. For example, a confidence score may be based on multiple externally generated stimuli and/or conditions that are obtained and/or detected over a time period. The higher the rate of detected externally generated stimuli and/or conditions that are individually indicative of the presence of a human being, the higher the confidence score may be, in an embodiment. A determined confidence score may be compared against a threshold to determine whether or not the target computing device is being utilized, operated, held, and/or carried by a person. Thresholds may be configurable, in an embodiment.

In an embodiment, one or more of the detected and/or obtained externally generated stimuli and/or conditions may be weighted with a respective value. Each respective weight value may be indicative of how strongly (or how weakly) its corresponding stimulus/condition is indicative of a human being actually interacting with the computing device. For example, a compass change may be considered more indicative of a user's actual presence at the target computing device than is a voice detected at a microphone, as the detected voice may be environmental and not as strongly indicative of a direct user of the target computing device. Accordingly, a detected compass change may be assigned a higher or stronger weight than is assigned to a detection of a voice. In an embodiment, values of one or more detected stimuli/conditions may be aggregated or totaled, e.g., over a given time period or interval. When the aggregated value passes a threshold, then the target computing device may infer that a human being is interacting with the target computing device (block 105), and accordingly, access may be granted (block 108).

In an embodiment, the target computing device may monitor the occurrences and/or types of detected, external stimuli and/or conditions over time. For example, the target computing device may set a timer, and as long as at least one subsequent external stimulus or condition is detected before the timer expires, the target computing device may infer that a human being is still interacting with the target computing device (block 105). As such, the target computing device may be granted access to the on-board communications network (block 108), and the timer may be reset. If the timer expires without detection of another stimulus/condition, however, access to the on-board communications network may be terminated, denied or temporarily paused (not shown). After the termination or denial of access, another detected stimuli/condition and/or a response to an explicit challenge may be required before access is resumed, in an embodiment.

In some embodiments, a combination of timing and weighting of stimuli and/or conditions may be considered and evaluated to generate a confidence score to utilize in determining whether or not access to a target computing device is to be granted or denied. In an example, the confidence score may be compared against a threshold. A confidence score above the threshold may be considered to be indicative of the target computing device being operated by human, while a confidence score below the threshold may be considered to be indicative of the target device not being operated by a human. The timers, weightings of stimuli/conditions, and/or thresholds may be modifiable, if desired.

For example, in an embodiment of the method 100 depicted in FIG. 2, at the block 105 a combination of factors including the strengths of signals generated by the target computing device over time (e.g., as shown in FIG. 3C), the comparison of acceleration values detected over time of the target computing device and of an accelerometer fixedly connected to the vehicle (e.g., as shown in FIGS. 3A and 3B), and optionally, a pattern of payload traffic that is generated by and/or received at the target computing device over time (not shown) may be utilized to create a confidence score corresponding to the target computing device. The determined confidence score may be compared to a threshold to determine whether or not the score is indicative of a person operating and/or holding the target computing device. If the determined confidence score is indicative of a person operating and/or holding the target computing device, the method 100 may proceed to the block 108. If the determined confidence score is indicative of a person not operating and not holding the target computing device, the method 100 may proceed to the block 110 or to the block 115. Of course, other factors in addition to or instead of signal strength, acceleration, and payload pattern may be utilized in generating a confidence score for a target computing device. Further, various factors may be respectively weighted as desired to determine a confidence score for a target computing device.

Figure 4:
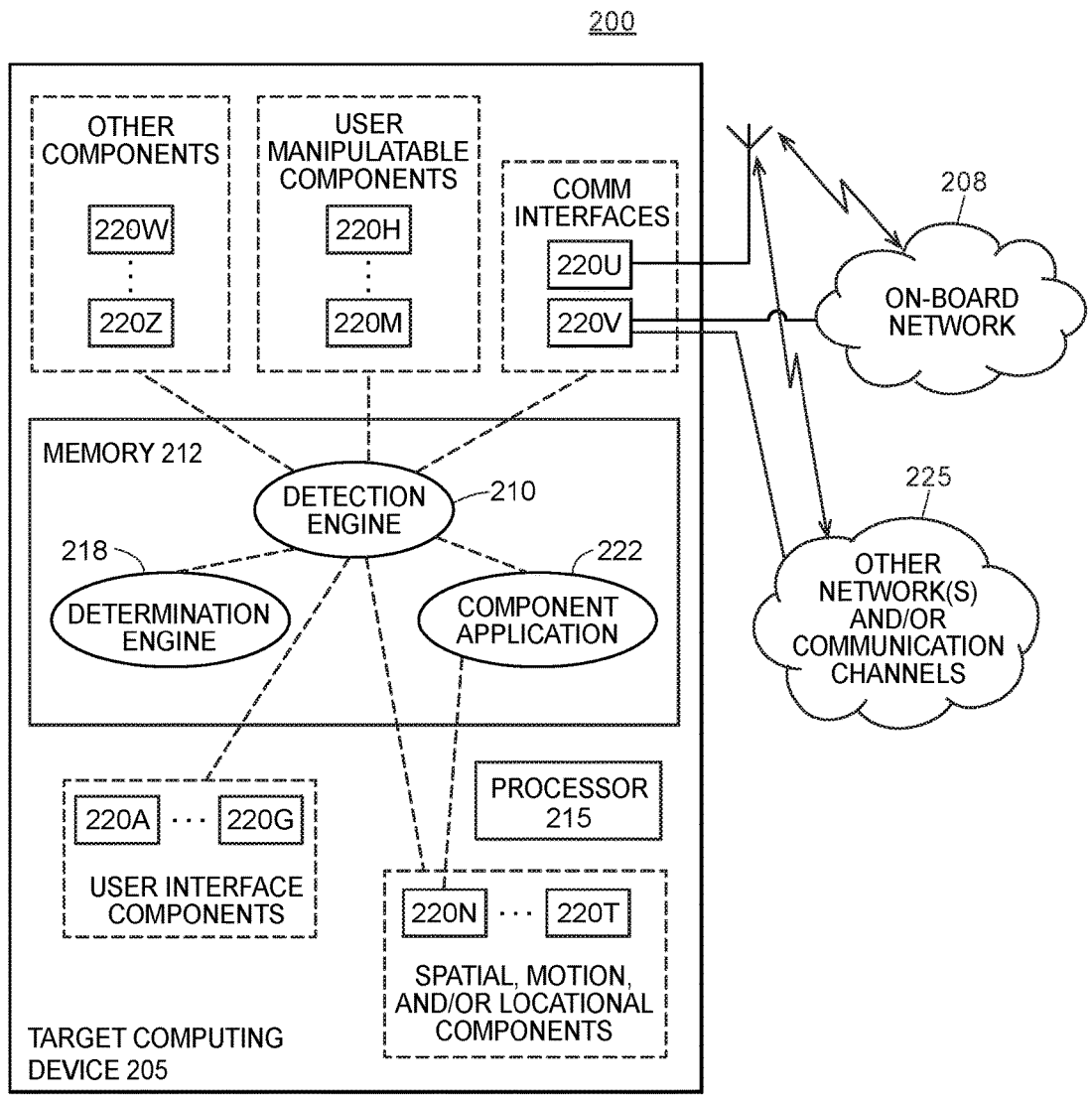
FIG. 4 illustrates a block diagram of an example system for averting and/or preventing unsanctioned access of a target computing device to a communications network on-board a vehicle.

FIG. 4 is an example of a block diagram of a system 200 for averting and/or preventing unsanctioned access, on-board a vehicle, of a target computing device 205 to an on-board communications network 208. The on-board communications network 208 may be a public or publicly-accessible network, e.g., a network that any member of the public may access via his or her computing or electronic device so long as certain criteria are met (such as providing the appropriate network key, agreeing to conditions and terms, paying for the use of the network and/or for services provided by the network, etc.), and the on-board communications network 208 may be secured or unsecured. The system 200 may operate in conjunction with a target computing device 205 to which access to the on-board network 208 is to be granted or denied. Indeed, in some embodiments, at least a portion of the system 200 is disposed on or at the target computing device 205. Further, the system 200 may execute one or more portions of the method 100 of FIG. 2, in an embodiment. In some embodiments, the system 200 may execute all of the method 100.

The system 200 may include a detection engine or unit 210, which is illustrated in FIG. 4 as being disposed at the target computing device 205. In an embodiment, the detection engine or unit 210 may comprise a set of computer-executable instructions that are stored on a tangible, non-transitory computer-readable storage medium of the target computing device 205, such as a memory 212. The computer-executable instructions may be executable by a processor 215 of the target computing device 205, for example. In some embodiments, at least a portion of the detection engine or unit 210 may comprise firmware and/or hardware. At any rate, whether implemented in software, firmware, and/or hardware, the detection engine or unit 210 may be configured to receive, detect, and/or otherwise obtain indications of externally-generated stimuli and/or conditions, and to provide information about the stimuli and/or conditions to a determination engine or unit 218 for analysis.

In an embodiment, the determination engine or unit 218 may comprise a set of computer-executable instructions that are stored on a tangible, non-transitory computer-readable storage medium of the target computing device 205, such as on the memory 212 or another local memory. The computer-executable instructions 218 may be executable by the processor 215 of the target computing device 205, for example. In some embodiments, at least a portion of the determination engine or unit 218 may comprise firmware and/or hardware. Whether implemented in software, firmware, and/or hardware, though, the determination engine or unit 218 may be configured to determine whether or not a detected stimulus or condition is indicative of the target computing device 205 being utilized, operated, held, and/or carried by a person or human being.

It is noted that although the detection engine or unit 210 and the determination engine or unit 218 are illustrated in FIG. 4 as being stored in the memory 212 of the target computing device 205, this is merely illustrative and thus a non-limiting embodiment. For example, at least one of the detection engine 210 or the determination engine 218 may not reside at the target computing device 205, but instead may reside on a memory (and maybe executed by a processor) of another computing device that is disposed within the vehicle and in communicative connection with the target computing device 205. In an embodiment, the other computing device on which the detection engine 210 and/or the determination engine 218 resides may be accessed by the target computing device 205 via a network and/or communication channel 225 other than the public on-board communications network 208. For example, the target computing device 205 and the other computing device may communicate by utilizing a near-field communications channel. In another embodiment, the other computing device on which the detection engine 210 and/or the determination engine 218 resides may be accessed by the target computing device 205 via the on-board network 208, however this access may be a limited access. For instance, the target computing device 205 may be granted access to only a remote detection engine 210 and/or to a remote determination engine 218 via the on-board network 208, and/or the limited access of the target computing device 2052 the network 208 may be granted for only a certain window of time.

In FIG. 4, indications of externally generated stimuli and/or conditions may be provided by one or more components 220 of the target computing device 205 to the detection engine 210. As such, the detection engine 210 may be in communicative connection with one or more components or devices (generally referred to herein by the reference 220) that are included in or part of the target computing device 205.

The components or devices 220 included in the target computing device 205 and with which the detection engine 210 may be in communicative connection may include one or more user interfaces 220A-220G via which a person may provide input to the target computing device 205. Examples of user interfaces 220A-220G may include a keyboard, a key pad, a mouse, a touch pad, a touch screen, a microphone, a tracking pad, a tracking ball, and/or other user interfaces. Additionally or alternatively, the components 220 of the target computing device 205 with which the detection engine 210 may be in communicative connection may include one or more user-manipulatable components 220H-220M and 220V. Typically (but not necessarily) such user-manipulatable components 220H-220M and 220V may include mechanical components that are accessible from the exterior of the computing device 205 and via which a user may physically manipulate to operate or change an aspect or state of the target computing device 205. Examples of user manipulatable components may include a power on/off switch; a control or switch to mute or silence the target computing device 205; one or more ports to receive a data storage device such as a memory card, a disc, a portable memory storage device and the like; one or more ports or interfaces to receive one or more wired network connections 220V; a port to receive a power cord connector, and other user-manipulatable components. For example, an ad-hoc stimulus corresponding to a user utilizing a user interface 220A-220G and/or manipulating a component 220H-220N, 220V may result in a corresponding indication or signal indicative of the stimuli being sent to the detection engine 210 from the component 220A-220N, 220V.

In an embodiment, the detection engine 210 may be in communicative connection with one or more components 220N-220T that provide indications of the spatial orientation, movement, speed, acceleration, location, etc. of the target computing device 205. For example, the detection engine 210 may be in communicative connection with an accelerometer, a compass 220N, a GPS (Global Positioning System) receiver, an altimeter, and/or another type of component that is included in the target computing device 205 and that detects, senses, and/or measures spatial orientation, movement, speed, acceleration, location, etc. of the target computing device 205.

In some embodiments, the detection engine 210 may be in communicative connection with at least one component 220 of the computing device 205 via a corresponding component application 222 stored on the computing device 205. For example, as shown in FIG. 4, the detection engine 210 is in communicative connection with the compass component 220N via a component application 222 (such as a compass application) that is stored in the memory 212 or in another local memory of the target computing device 205, and that is executed by the processor 215 of the target computing device 205. The component application 222 may transmit, to the detection engine 210, indications of conditions detected by the compass component 220N. Generally, the detection engine 210 may be in communicative connection with any component 220 of the target computing device 205 at which an externally generated stimulus and/or condition may be detected or inferred, and in some cases by communicating with a respective component application 222 of the particular component 220. In some embodiments, a single component application 222 may service multiple components 220.

The target computing device 205 may include one or more communication interface components 220U-220Z. For example, the target computing device may include one or more wireless communication interfaces 220U (e.g., transceivers and antennas for Wi-Fi, cellular, short-range wireless, near-field communications, etc.) via which the target computing device 205 is able to communicatively connect to one or more types of wireless networks, and/or the target computing device may include one or more wired communication interfaces 220V (e.g., Ethernet, HDMI, and/or other physical ports) via which the target computing device 205 is able to communicatively connect to one or more types of wired networks. The computing device 205 may utilize one or more of its wireless communication interfaces 220U (and optionally one or more of its wired communication interfaces 220V) to connect to the on-board network 208, if and when access thereto is granted.

Further, in addition to components 220A-220V, the target computing device may include other components 220W-220Z such as a bus, various memories or storage devices such as Random Access Memories (RAM) and Read Only Memories (ROM), and other components. It is noted that although a finite number of components 220A-220Z are shown in FIG. 4, other numbers and types of components may be included in the target computing device 205. For example, the target computing device 205 may include fewer components, more components, and/or different components than is illustrated by FIG. 4.

Returning now to the detection engine 210, after receiving an indication of a detection of an externally generated stimulus or condition from one of the components 220 of the target computing device 205, the detection engine 210 may provide an indication or information about the externally generated stimulus/condition to the determination engine 218. For example, the detection engine 210 may indicate the particular component at which the stimulus/condition was detected, the nature or content of the stimulus/condition, a time stamp, and/or other information pertaining to the detected stimulus/condition. Based on the indication and/or information received from the detection engine 210, the determination engine 218 may determine whether or not the detected, externally generated stimulus/condition is indicative of the target computing device 205 being utilized, or operated, held, and/or carried by a person, in a manner such as previously discussed with respect to FIG. 2. For example, the determination engine 218 may assess whether or not information transmitted by a beacon and received via wireless interface 220U includes expected data (e.g., flight number, tail number, SSID, etc.), the determination engine 218 may process an image received via an optical interface to determine whether or not an image of a person and/or of the vehicle environment is included in the image, the determination engine 218 may track the number and types of externally generated stimuli and/or conditions obtained over time, the determination engine 218 may weight various stimuli/and/or conditions, the determination engine 218 may determine and/or maintain a confidence score and compare the confidence score against a threshold, etc., e.g., in manners such as previously discussed with respect to the method 100 of FIG. 2.

In embodiments in which the determination engine 218 compares vehicle travel or heuristic data generated by devices that are fixedly connected to the vehicle (e.g., on-board sensing and/or monitoring devices) with data generated by sensing and/or monitoring components 220N-200T of the target computing device 205 (e.g., as discussed above with respect to FIGS. 2, 3A, and 3B), the determination engine 218 may receive and/or obtain vehicle travel or heuristic data from other devices (e.g., that are fixedly connected to the vehicle) and/or applications executing thereon via the one or more communication interfaces 220U, 220V. In these embodiments, limited access to the on-board communications network 208 may be provided to the target computing device 205 so that the detection engine 210 is able to receive and/or obtain vehicle travel or heuristic data from the other devices and/or applications. For example, access to the on-board network 208 may be granted to only the detection engine 210, and/or to the detection engine 210 may be granted permission to communicate only with particular on-board devices and/or applications that provide vehicle travel or heuristic data. In another embodiment, rather than utilizing the public, on-board network 208 in a limited manner to enable communications between the detection engine 210 and on-board vehicle travel data providers, the detection engine 210 may utilize a communicative connection other than the public, on-board network 208 to communicate with the other devices and/or applications. For example, the detection engine 210 and the on-board devices and/or applications providing vehicle travel data may communicate via some other communication channel 225 that is segregated or separated from the public, on-board communications network 208.

Based on its determination as to whether or not the target computing device 205 is being operated, held, and/or carried by a person on-board the vehicle, the determination engine 218 may cause general access of the target computing device 205 to the on-board communications network 208 to be granted or denied. If access is granted, then the target computing device 205 may be free to utilize one or more of its communication interfaces 220U, 220V to communicatively connect to the on-board network 208. For example, upon a determination that general access to the network 208 is granted, the target computing device 205 may automatically join a Wi-Fi on-board network 208 using a network key or password that has been previously stored at the target computing device 205. If access is denied, then the determination engine 218 may cause access to the on-board network 208 by the target computing device 205 to be prevented. For example, the determination engine 218 may cause the communication interfaces 220U, 220V to be disabled and/or turned off (e.g., logically and/or physically disabled and/or turned off), and/or may cause the access of applications executing on the target computing device 205 to the communication interfaces 220U, 220V to be blocked. In some embodiments, an indication of the granted or denied access may be presented on a user interface 220A-220G.

In some embodiments, partial access of the target computing device 205 to the on-board communications network 208 may be granted by the determination engine 218. For example, if a confidence score is within a certain range, partial access may be granted for only certain applications and/or services provided via the on-board network 208.

As previously discussed, in some embodiments of the system 200, the detection engine 210 and/or the determination engine 218 may be stored in the memory 212 of the target computing device 205. For example, the detection engine 210 and/or the determination engine 218 may be implemented as one or more applications that are stored and executed on the target computing device 205. In an embodiment, the detection engine 210 and/or the determination engine 218 may be included in one or more applications that are provided by the on-board service provider to be downloaded to passengers' devices so that the devices are able to access on-board networks and services provided by the on-board service provider (e.g., an on-board service application of the on-board service provider). In these embodiments, the detection engine 210 and/or the determination engine 218 may be associated with a user and/or a user account of the on-board service provider, and may be downloaded from a server (or set of back-end computing devices) of the on-board service provider to the target computing device 205. Typically, but not necessarily, the back-end server or servers are located on the ground, and are accessible via ground-based public and private networks, such as the Internet. In some situations, though, the detection engine 210 and/or the determination engine 218 may be downloaded from a server that is on-board the vehicle.

The detection engine 210 and/or the determination engine 218 may be downloaded onto the target computing device 205 prior to the user and/or the target computing device 205 initially attempting to connect to the on-board communications network 208. Typically, the downloaded detection engine 210 and/or determination engine 218 may include data corresponding to the user and/or to the user account. Such user data or user account data may include an identification of the user, a photo and/or image of the user, an identification of the account, payments, charges, account balances, travel itineraries, on-board network keys, passcodes, and/or passwords, and/or other data that may be utilized for on-board identification, authentication, authorization, and/or validation. At least some of the user data included in the downloaded engines 210 and/or 218 may be utilized to determine whether or not the target computing device 205 is being utilized, operated, carried, and/or held by the user associated with the account, or by any user for that matter, e.g., in a manner such as previously discussed with respect to FIG. 2.

In an embodiment, upon the target computing device 205 detecting the presence of the on-board network 208, the detection engine 210 may automatically be initialized and/or invoked to determine whether or not the subject target computing device 205 is presently being operated, utilized, held, and/or carried by a person. In embodiments in which the detection engine 210 is included in an application that is provided by the on-board service provider to be downloaded onto passenger devices (e.g., an on-board service application) to enable the devices to access on-board networks and services, the detection engine 210 may be automatically initialized and/or invoked when the on-board service application is initialized. Other triggers may cause the detection engine 210 to be automatically invoked, e.g., an initialization of the target computing device 205, the user opening any application on the target computing device 205, an explicit user request, the reception of user input at any user interface of the target computing device, etc. Consequently, with the system 200, the target computing device 205 may be automatically verified as being utilized, operated, held, and/or carried without requiring any explicit user action, such as opening a browser to respond to a CAPTCHA challenge. As such, the user is provided a seamless and intuitive user experience, as well as quicker access to the on-board network 208 and available services and applications as compared with a CAPTCHA-only validation technique.

Further, although FIG. 4 illustrates one embodiment of the system 200, other embodiments (not shown) may be possible. For example, the detection engine 210 and the determination engine 218 may be aggregated into a single, unitary engine, unit, and/or application at the target computing device 205. In another example, at least some of the component applications 222 may be included in the detection engine 210.

In yet another example, the detection engine 210 may reside at the target computing device 205, while the determination engine 218 may reside at another computing device (not shown) that is fixedly connected to the vehicle. In this example, limited access to the on-board communications network 208 may be initially provided to the target computing device 205 so that the detection engine 210 is able to communicate with the on-board determination engine 218 to determine whether or not the target computing device 205 is being operated, used, held, and/or carried by a person, in an embodiment. In another embodiment, rather than utilizing the public, on-board network 208 in a limited manner to enable communications between the detection engine 210 and the on-board determination engine 218, the detection engine 210 and the on-board determination engine 218 may utilize a communicative connection other than the public, on-board communications network 208. For example, the detection engine 210 and the on-board determination engine 218 may communicate by utilizing near-field communications or some other communication channel 225 that is segregated or separated from the public, on-board network 208.

Figure 5:
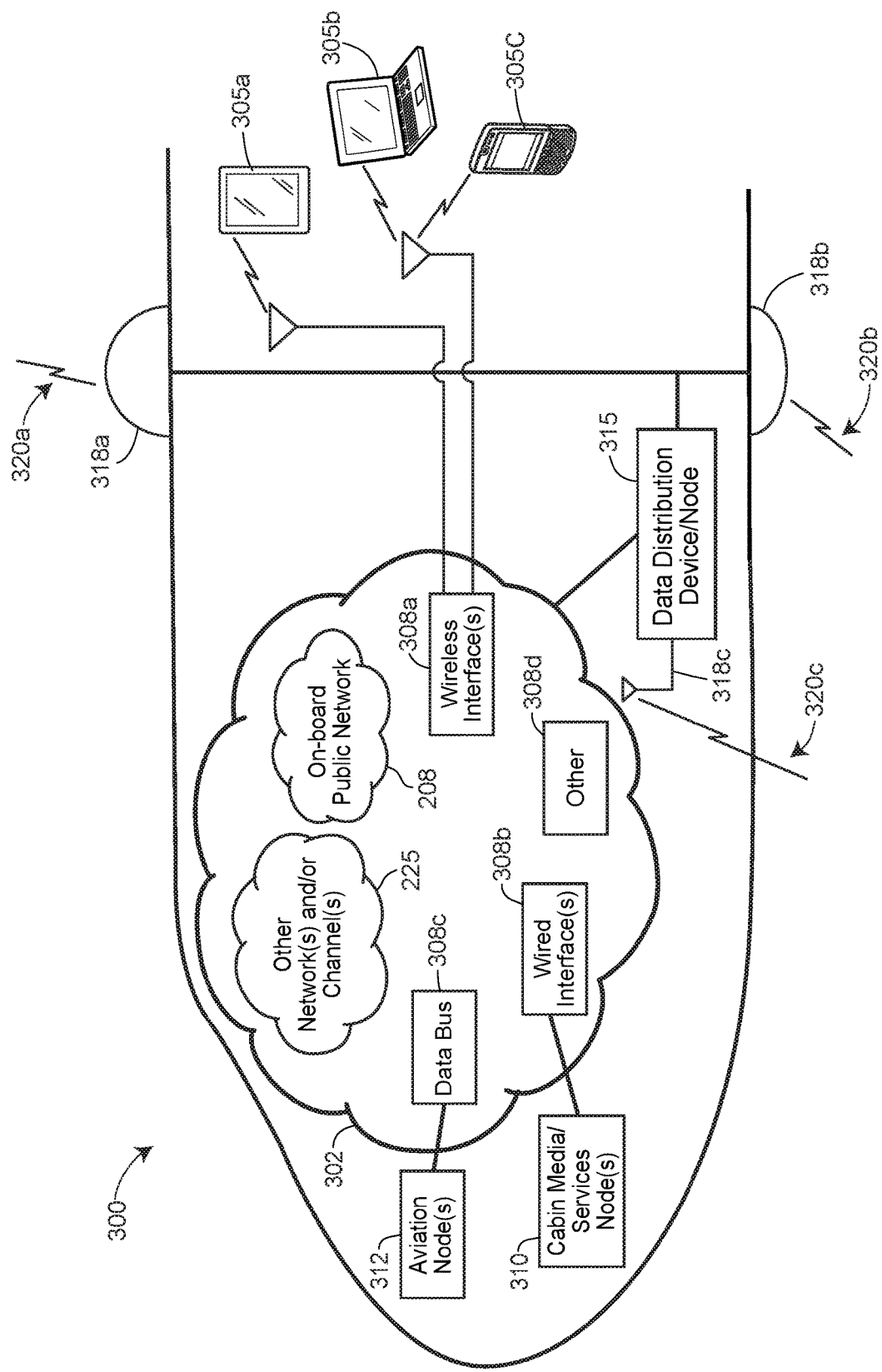
FIG. 5 includes a block diagram of an example vehicle having one or more on-board communications networks, access to which may be governed by the method of FIG. 2 and/or by the system of FIG. 4.

FIG. 5 illustrates an embodiment of a vehicle 300 having one or more on-board communications networks 302, at least a portion of which is public. That is, computing or electronic devices 305a, 305b, 305c that passengers, crew, and other members of the public bring on-board the vehicle 300 may be granted access to at least a public portion of the one or more on-board communications networks 302 via, for example, the method 100 of FIG. 2 and/or the system 200 of FIG. 4. The vehicle 300 is depicted in FIG. 5 as an airplane in flight, however, the techniques described herein may easily be applied to other vehicles that provide transport for people, such as other types of aircraft, ships, trains, cars, buses, or any other type of vehicle that has the ability move through the air, on the ground, through space, or on water. Further, the one or more on-board networks 302 may include, for example, the public, on-board network 208 and/or other networks 225 of FIG. 2, and indeed, any of the components, principles, methods, apparatuses, devices, and/or techniques discussed with respect to FIG. 5 are applicable to any of the components, principles, methods, apparatuses, devices, and/or techniques discussed with respect to FIGS. 2-4. Additionally, the one or more on-board communications networks 302 may include one or more other public and/or private networks.

The one or more on-board networks 302 may include a plurality of nodes. A "node," as generally referred to herein, may comprise one or more computing devices having one or more processors, a network interface, and one or more memories storing computer-executable instructions. The instructions may be executed by the processor(s) to perform one or more actions. For example, the computer-executable instructions may be executed to communicate, via the network interface, over one or more networks for various purposes, e.g., to discover other nodes, services, and/or applications, to publish or provide services to the network, to consume published or provided services, and/or to perform other actions. Additionally or alternatively, nodes may execute instructions stored thereon to host various services and/or to execute various applications, at some of which may be made available to other nodes. In some embodiments, a node may additionally or alternatively comprise firmware and/or hardware that are operable to perform one or more actions. In some embodiments, a node may include one or more user interfaces and/or one or more network interfaces.

In some scenarios, a node may be a logical entity. For example, a node may comprise a virtual machine hosted by or executed on one or more computing devices, or a "node" may comprise an interpreted scripting or engine (e.g., a determination engine 218) hosted by or executed on one or more computing devices. As such, in some embodiments, multiple nodes may reside on a single, physical computing device.

In some embodiments, a node may be located on or within a vehicle so that the node is transported along with the vehicle as the vehicle moves, e.g., a "transported node." For example, a transported node may be an end-user consumer computing device such as a laptop computer, a handheld portable computing device, a phone, tablet or smart device, or other device that generally is not fixedly or rigidly attached to the vehicle by a tangible, physical connection. In other examples, a transported node may be a computing device that is fixedly and/or rigidly connected to a vehicle using a tangible, physical connection so that node is prevented from moving about the vehicle in an uncontrolled fashion when the vehicle moves. For example, a fixedly connected, transported node such as a navigation device, a cockpit electronics unit, a cabin electronics unit, or other device may be included in a line replaceable unit (LRU)

on-board and fixedly connected to the vehicle. Indeed, a vehicle may transport multiple nodes, at least some of which are rigidly and fixedly connected to the vehicle, and at least some of which are not rigidly and fixedly connected to the vehicle. Typically, but not necessarily, nodes that include sensors and/or monitoring devices that generate vehicle travel or heuristic data may be fixedly connected to the vehicle.

For ease of discussion, the one or more on-board communications networks 302 disposed within the vehicle 300 are generally referred to herein using the singular tense. However, it is understood that the on-board communications network 302 may include one or more wired networks, one or more wireless networks, or a collection of wired and wireless networks. The one or more networks 302 may include one or more private and/or public networks. For example, the network 302 may include the public, on-board communications network 208 of FIG. 2. In some embodiments, the network 302 may include multiple different types of wired and wireless network links or data bearer channels implementing different link-layer and network-layer protocols. For example, the one or more on-board networks 302 may include one or more wireless networks or interfaces 308a, such as to a cellular communications network localized to the cabin of the aircraft, to a Wi-Fi network, to a wireless Ethernet network, to a Bluetooth® or other short distance wireless communications system, to a near-field wireless communications (NFC) system, etc. On-board devices or nodes that have wireless communication abilities may connect to the network 302 via one or more wireless interfaces 308a, for example. In an embodiment, at least one of the wireless interfaces 308a may provide access to the public, on-board communications network 208.

Additionally or alternatively, the network 302 may include one or more wired networks or interfaces 308b, such as a wired Ethernet, Local Talk, or other type of CSMA/CD (Carrier Sense Multiple Access/Collision Detection) network, token ring, FDDI (Fiber Distributed Data Interface), ATM (Asynchronous Transfer Mode), etc. Examples of nodes that may connect to the network 302 via wired interfaces 308b include a cabin entertainment/media node that stores in-flight entertainment and other consumable content, and/or devices utilized by the cabin crew for flight services purposes (e.g., communications between crew members, passenger service and safety, etc.) (reference 310). In an embodiment, at least one of the wired interfaces 308b may provide access to the public, on-board communications network 208.

Further, in some embodiments, the network 302 may include an aircraft data bus or other suitable interface 308c to on-board aviation-specific networks 312 via which connections may be established to, for example, cockpit electronics nodes, flight instrumentation systems, on-board maintenance systems, and the like. For example, the data is utilized by aviation nodes 312 be may be compliant with the ARINC-429, MIL-STD-1553, IEEE 802.3, or other suitable standard. Generally, aviation-specific networks 312 may be private networks that are walled off against public use or access. Still further, the network 302 may include other types of networks and interfaces 308d to other types of nodes (not shown). Examples of some (but not all possible) types of networks which may be included in the one or more networks 302 are described in U.S. patent application Ser. No. 13/675,200, filed Nov. 13, 2012 and entitled "Vehicle Data Distribution System and Method," and in U.S. patent application Ser. No. 13/675,190 entitled "Ground System for Vehicle Data Distribution" and now issued as U.S. Pat. No. 9,088,613, the disclosures of which are hereby incorporated by reference in their entireties.

Another node of the on-board communications network 302 may be a data distribution node or device 315. The data distribution node or device 315 may be fixedly connected to the vehicle (e.g., via an LRU when the vehicle 300 is an aircraft), and may be the node via which data is received onto and delivered from the vehicle 300 while the vehicle 300 is in transit and/or is stationary. For ease of reading, the data distribution node or device 315 is referred to herein using the singular tense, as the node/device 315 may have a singular logical appearance to other nodes of the network 302. However, the data distribution node or device 315 may be implemented utilizing multiple physical computing devices or nodes, if desired.

Typically, the data distribution node or device 315 may be communicatively connected to one or more transceiver/antenna systems 318a, 318b, 318c over which data is transmitted via a corresponding wireless link or bearer that may communicatively connect to an antenna/transceiver that is disposed on the ground or that is otherwise external to the vehicle 300. For example, the data distribution node 315 may send and/or receive data via a satellite transceiver/antenna system 318a that uses a satellite wireless link or bearer 320a (e.g., over the Ku-band, Ka-band, L-band, S-band, etc.) to deliver data from and/or receive data onto the vehicle 300. Additionally or alternatively, the data distribution node 315 may send and/or receive data via an air-to-ground (ATG) transceiver/antenna system 318b that uses a non-satellite, ATG wireless link or bearer 320b (e.g., over the S-band, cellular/LTE bands, or other designated band) to deliver data from and/or receive data onto the vehicle 300. Still additionally or alternatively, the data distribution node 315 may send and/or receive data via a Wi-Fi, cellular, or other ground-based wireless transceiver/antenna system 318c and link/bearer 320c to deliver data from and/or receive data onto the vehicle 300. (Typically, the ground-based wireless transceiver/antenna system 318c may have a shorter range than that of the other systems 318a, 318b and may be utilized only when the vehicle is not air-borne and/or is parked.) In some embodiments, the vehicle 300 may include a transceiver/antenna system (not shown) over which data may be transmitted via a corresponding air-to-air wireless link that communicatively connects the vehicle 300 with another air-borne vehicle. While FIG. 5 illustrates the vehicle 300 as including multiple types of transceiver/antenna systems 318a, 318b, 318c via which data may be delivered onto and off of the vehicle 300, in some embodiments, the vehicle 300 may include only one of the transceiver/antenna systems 318a, 318b for data delivery, and/or may not include the transceiver/antenna system 318c. Examples of data delivery links for transporting data to/from the on-board network 302 may be found in aforementioned U.S. patent application Ser. No. 13/675,200 and U.S. Pat. No. 9,088,613.

Generally, the data distribution node or device 315 may aggregate or otherwise package data received from on-board nodes for delivery off of the vehicle 300 via one or more of the transceiver/antenna systems 318a-318c and their respective wireless links 320a-320c. Additionally, the data distribution node or device 315 may disaggregate or otherwise un-package data received onto the vehicle via one or more of the transceiver/antenna systems 318a-318c and their respective wireless links 320a-320c, and may route various data packets included therein via the network 302 to respective on-board destination nodes. Examples of embodiments of the data distribution node or device 315 may be found in aforementioned U.S. patent application Ser. No. 13/675,200 and U.S. Pat. No. 9,088,613.

The data distribution device 315 may enable personal tablets 305a, computers 305b, phones/smart devices 305c, and/or other computing or electronic devices that have been brought on-board the vehicle 300 and that have been granted access to the public on-board network 208 (e.g., via the method 100 and/or the system 200) to communicate with other devices that are not on-board the vehicle 300 or that are on the ground. For example, data may be delivered, between one of the on-board devices 305a-305c and a ground computing device, via the on-board public network 208, one or more other portions of the network 302, the data distribution node 315, and one or more of the transceiver/antennas 318a, 318b and their respective wireless links 320a, 320b. Additionally or alternatively, the data distribution device 315 may enable one or more of the on-board devices 305a-305c to communicate with other devices that are on-board the vehicle via the on-board public network 208 and other portions of the network 302, provided that appropriate permission and/or authorization criteria are met. Examples of managing communications between on-board public devices 305a-305c (and/or applications executing thereon) and other on-board and/or off-board nodes, devices, and/or applications may be found, for example, in commonly-owned U.S. Pat. No. 9,087,193; U.S. patent application Ser. No. 15/092,844, filed on Apr. 7, 2016 and entitled "Systems and Methods for On-Board Access Control"; and U.S. patent application Ser. No. 15/092,884, filed on Apr. 7, 2016 and entitled "Systems and Methods for Authenticating Applications to On-Board Services", the disclosures of which are hereby incorporated by reference in their entireties.

Typically, but not necessarily, the aviation nodes 312, the cabin media/services nodes 310, and the data distribution node 315 are implemented in line-replaceable-units (LRUs) that are fixedly connected to the vehicle. An LRU may be an electronic assembly that performs a specific function in the aircraft 100 and that may be removed or replaced as a unit and serviced at an aircraft maintenance center or flight line.

In an embodiment, the aviation nodes 312, the data distribution node 315, and/or other nodes of the network 302 may include one or more devices and/or components that generate, sense, monitor, and/or detect vehicle travel or heuristic data. For example, the aviation nodes 312, the data distribution node 315, and/or other nodes of the network 302 may include one or more accelerometers, compasses, GPS receivers, altimeters, and/or other components that detect or sense the spatial orientation, location, position, movement, speed, and other vehicle travel or heuristic data while the vehicle 300 is in transit. In an embodiment, at least some of the detected and/or sensed vehicle travel data may be transmitted from the aviation nodes 312, the data distribution of 315, and/or other nodes of the network 302 to one or more detection engines 210 corresponding to one or more target computing devices 205 (e.g., detection engines 210 corresponding to devices 305a, 305b, 305c) for comparison with data that is detected or sensed by components of the target computing devices 205, such as in a manner similar to that discussed with respect to FIGS. 2, 3A, 3B, and 4.

In an embodiment, the data distribution node 315 may include one or more of the component applications 222 that are in communicative connection with respective sensors, monitors, detectors, and the like (e.g., one or more of the components 220N-220T of FIG. 2). The component applications 222 may collect various vehicle travel or heuristic data from one or more on-board sensors, monitors, and/or other devices or components, and may cause at least the content of the collected vehicle travel or heuristic data to be delivered to one or more detection engines 210 corresponding to one or more target computing devices 205 (e.g., detection engines 210 corresponding to devices 305a, 305b, 305c) for comparison with data that is detected or sensed by components of the target computing devices 205, such as in a manner similar to that discussed with respect to FIGS. 2, 3A, 3B, and 4.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method of averting unsanctioned access to a network on-board a vehicle, the network being an on-board network, and the method comprising detecting, at a computing device that is on-board the vehicle, one or more externally generated stimuli or conditions, the one or more externally generated stimuli or conditions excluding a response to a challenge issued at a user interface of the computing device. Additionally, the method comprises determining whether or not the one or more externally generated stimuli or conditions are contextual to the vehicle and indicative of the computing device being utilized by one or more persons who are on-board the vehicle; and granting access of the computing device to the on-board network via which the computing device is able to communicate with one or more other computing devices, the granting based on a determination that the one or more externally generated stimuli or conditions are contextual to the vehicle and indicative of the computing device being utilized by the one or more persons who are on-board the vehicle.

2. The method of the previous aspect, further comprising denying access of the computing device to the on-board network based on a determination that the one or more externally generated stimuli or conditions are not indicative of the computing device being utilized by any person who is on-board the vehicle.

3. The method of any one of the previous aspects, further comprising (i) presenting a particular challenge at the user interface of the computing device based on a determination that the one or more externally generated stimuli or conditions are not indicative of the computing device being utilized by any person who is on-board the vehicle; and (ii) one of: granting access of the computing device to the on-board network when a suitable response to the particular challenge is received; or denying access of the computing device to the on-board network when (a) an unsuitable response to the particular challenge is received, or (b) no response to the particular challenge is received within a time interval.

4. The method of any one of the previous aspects, wherein determining whether or not the one or more externally generated stimuli or conditions are contextual to the vehicle and indicative of the computing device being utilized by the one or more persons who are on-board the vehicle comprises determining a confidence score based on the one or more externally generated stimuli or conditions and comparing the confidence score to a threshold.

5. The method of the previous aspect, wherein determining the confidence score based on the one or more externally generated stimuli or conditions comprises determining the confidence score based on a set of multiple externally generated stimuli or conditions detected by the computing device over an interval of time.

6. The method of any one of the previous aspects, wherein determining whether or not the one or more externally generated stimuli or conditions are indicative of the computing device being utilized by the one or more persons who are on-board the vehicle comprises obtaining an indication of an input received at a user interface of the computing device.

7. The method of any one of the previous aspects, wherein determining whether or not the one or more externally generated stimuli or conditions are contextual to the vehicle and indicative of the computing device being utilized by the one or more persons who are on-board the vehicle comprises determining that data captured by an optical interface of the computing device while on-board the vehicle is changing over time.

8. The method of any one of the previous aspects, wherein determining whether or not the one or more externally generated stimuli or conditions are contextual to the vehicle and indicative of the computing device being utilized by the one or more persons who are on-board the vehicle further comprises determining that an image captured by the optical interface of the computing device while on-board the vehicle includes an image of at least a part of a person.

9. The method of any one of the previous aspects, further comprising obtaining, at the computing device, respective indications of one or more signals that are generated by one or more devices fixedly connected to the vehicle; and wherein determining whether or not the one or more externally generated stimuli or conditions are contextual to the vehicle and indicative of the computing device being utilized by the one or more persons who are on-board the vehicle is based on the respective indications of the one or more signals.

10. The method of any one of the previous aspects, wherein determining whether or not one or more externally generated stimuli or conditions are contextual to the vehicle and indicative of the computing device being utilized by the one or more persons who are on-board the vehicle based on the respective indications of the one or more signals comprises at least one of comparing respected values of the one or more signals with a threshold; or comparing the respective values of the one or more signals with data generated by the computing device.

11. The method of any one of the previous aspects, wherein obtaining the respective indications of the one or more signals that are generated by one or more devices fixedly connected to the vehicle comprises obtaining an indication of a strength of a signal generated by a wireless access point on-board the vehicle.

12. The method of any one of the previous aspects, wherein obtaining the respective indications of the one or more signals that are generated by one or more devices fixedly connected to the vehicle comprises obtaining a respective indication of the computing device detecting a respective signal generated by each of a plurality of wireless transmitters that are fixedly connected to the vehicle.

13. The method of any one of the previous aspects, wherein obtaining the respective indications of the one or more signals that are generated by the one or more devices fixedly connected to the vehicle comprises at least one of obtaining a Service Set Identifier (SSID) or other identifier of the on-board network or obtaining an indication of a service provided by another device via the on-board network.

14. The method of any one of the previous aspects, wherein: obtaining the respective indications of the one or more signals that are generated by the one or more devices fixedly connected to the vehicle comprises obtaining an indication of an output generated by a spatial orientation detector fixedly connected to the vehicle; and determining whether or not the one or more externally generated stimuli or conditions are contextual to the vehicle and indicative of the computing device being utilized by the one or more persons who are on-board the vehicle comprises comparing the output generated by the fixedly connected spatial orientation detector with an output generated by a spatial orientation detector of the computing device.

15. The method of any one of the previous aspects, wherein obtaining the respective indications of the one or more signals that are generated by the one or more devices fixedly connected to the vehicle comprises obtaining an indication of an output that is generated by one or more devices fixedly connected to the vehicle and that includes data indicative of at least one of the vehicle, a particular journey of the vehicle, or one or more conditions detected by monitoring equipment on-board the vehicle while the vehicle is in transit.

16. The method of any one of the previous aspects, wherein the computing device is a mobile computing device.

17. The method of any one of the previous aspects, wherein granting access of the computing device to the on-board network via which the computing device is able to communicate with one or more other computing devices comprises granting access of the computing device to the on-board network via which the computing device is able to communicate with another computing device that is not on-board the vehicle.

18. The method of any one of the previous aspects, wherein at least a portion of the method is performed by an application comprising machine readable instructions stored on a non-transitory computer readable storage medium or media of the computing device and executed by a processor of the computing device.

19. The method of any one of the previous aspects, wherein the at least the portion of the method is performed by the application upon initialization of the application.

20. Means for performing any one of the previous aspects.

21. The method of any one of claims 1-19 performed by a system.

22. The system of aspect 21, wherein the system comprises computer-executable instructions stored on one or more memories and executable by one or more processors.

23. The system of any one of aspects 21-22, wherein the system comprises firmware.

24. The system of any one of aspects 21-23, wherein the system comprises hardware.

25. The system of any one of aspects 21-24, wherein at least a portion of the system is disposed on the computing device.

26. The system of any one of aspects 21-25, wherein at least a portion of the system is disposed on another computing device on-board the vehicle.

27. A system for averting unsanctioned access to a network on-board a vehicle, the network being an on-board network, and the system comprising means for detecting one or more stimuli or conditions that are external to a computing device that is on-board the vehicle, the one or more externally generated stimuli or conditions excluding a response to a challenge issued at a user interface of the computing device; means for determining whether or not the one or more externally generated stimuli or conditions are contextual to the vehicle and are indicative of the computing device being utilized by one or more persons who are on-board the vehicle; and means for granting access of the computing device to the on-board network, the granting based on a determination that the one or more externally generated stimuli or conditions are contextual to the vehicle and indicative of the computing device being utilized by the one or more persons who are on-board the vehicle.

28. The system of the previous aspect, further comprising any one of aspects 1-26.

29. The system of any one of aspects 27-28, further comprising means for denying access of the computing device to the on-board network based on a determination that the one or more externally generated stimuli or conditions are not indicative of the computing device being utilized by a person who is on-board the vehicle.

30. The system of any one of aspects 27-29, further comprising means for presenting a particular challenge at the user interface of the computing device based on a determination that the one or more externally generated stimuli or conditions are not indicative of the computing device being utilized by any person who is on-board the vehicle; and one of: means for granting access of the computing device to the on-board network upon a reception of a suitable response to the particular challenge; or means for denying access of the computing device to the on-board network upon (i) a reception of an unsuitable response to the particular challenge, or (ii) a failure to receive any response to the particular challenge within a time interval.

31. The system of any one of aspects 27-30, wherein the means for determining whether or not the one or more externally generated stimuli or conditions are contextual to the vehicle and are indicative of the computing device being utilized by the one or more persons who are on-board the vehicle comprises means for determining a confidence score based on more than one externally generated stimuli or conditions detected over an interval of time and means for comparing the confidence score to a threshold.

32. The system of any one of aspects 27-31, wherein the means for determining whether or not the one or more externally generated stimuli or conditions are contextual to the vehicle and are indicative of the computing device being utilized by the one or more persons who are on-board the vehicle comprises at least one of: means for obtaining an indication of an ad-hoc input received at a user interface or a manipulatable component of the computing device; or means for determining that data captured by an optical interface of the computing device while on-board the vehicle is at least one of: changing over time, including an image of at least a part of a person, or including an image of at least a part of the vehicle.

33. The system of any one of aspects 27-32, further comprising means for obtaining respective indications of one or more signals that are generated by one or more devices fixedly connected to the vehicle; and wherein the one or more externally generated stimuli or conditions correspond to the respective indications of the one or more signals that are generated by the one or more devices fixedly connected to the vehicle.

34. The system of any one of aspects 27-33, wherein the determination of whether or not one or more externally generated stimuli or conditions are contextual to the vehicle and are indicative of the computing device being utilized by the one or more persons who are on-board the vehicle is based on at least one of: a comparison of respective values of the one or more signals generated by the one or more devices fixedly connected to the vehicle with a threshold; a comparison of the respective values of the one or more signals generated by the one or more devices fixedly connected to the vehicle with user account data stored at the target computing device; or a comparison of the respective values of the one or more signals generated by the one or more devices fixedly connected to the vehicle with data generated by a sensor or detector in the computing device.

35. A system for averting unsanctioned access to a network on-board a vehicle, the network being an on-board network, and the system comprising: a detection engine that is communicatively coupled to one or more components of a computing device on-board the vehicle and that is configured to detect, via the coupling to the one or more components, one or more stimuli or conditions that are external to the computing device; a determination engine coupled to the detection engine and configured to determine, based on the one or more stimuli or conditions detected by the detection engine, whether or not the computing device is being utilized by one or more persons who are on-board the vehicle, wherein a grant or a denial of access of the computing device to the on-board network is based on a determination of the determination engine.

36. The system of the previous aspect, further comprising any one of aspects 1-34.

37. The system of any one of aspects 35-36, wherein the one or more components of the computing device include one or more wireless interfaces communicatively coupled to one or more other devices fixedly connected to the vehicle, and wherein the determination of whether or not the computing device is being utilized by the one or more persons is based on at least one of a content or a strength of a wireless signal generated by the one or more other devices and received at the computing device via the one or more wireless interfaces.

38. The system of any one of aspects 35-37, wherein the one or more components of the computing device include a sensor or monitor, and wherein the determination of whether or not the computing device is being utilized by the one or more persons is based on a comparison, over time, of (i) data generated by the sensor or monitor of the computing device, and (ii) vehicle travel or heuristic data generated by a sensor or monitor of another device that is fixedly connected to the vehicle.

39. The system of any one of aspects 35-38, wherein the one or more components of the computing device include at least one of a user interface or an optical interface via which ad-hoc data is received, and wherein the one or more stimuli or conditions are based on the received, ad-hoc data.

40. The system of any one of aspects 35-39, wherein: the detection engine comprises a first set of computer-executable instructions; the determination engine comprises a second set of computer-executable instructions; and the computing device is a mobile computing device having (i) a memory on which at least one of the first set of computer-executable instructions or the second set of computer-executable instructions are stored, and (ii) a processor to execute the at least one of the first set of computer-executable instructions or the second set of computer-executable instructions.

41. The system of the previous aspect, wherein the processor is triggered to execute the first set of computer-executable instructions upon at least one of: an initialization of the computing device; an initialization of a web browser at the computing device; an initialization of a first application in which the first set of computer-executable instructions are included; an initialization of second application at the computing device; or a detection, at the computing device, of a wireless signal transmitted by a device that is fixedly connected to the vehicle.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of averting unsanctioned access to a network on-board a vehicle, the network being an on-board network, and the method comprising:

detecting, at a portable computing device and based on a presence of a wireless signal that is received via a wireless interface of the portable computing device and that is generated by a transceiver that is on-board the vehicle and fixedly connected to the vehicle, that the portable computing device is on-board the vehicle;

detecting, at the portable computing device via the wireless interface, one or more externally generated stimuli or conditions, the one or more externally generated stimuli or conditions excluding a response to a challenge issued at a user interface of the portable computing device and including a first set of values generated over time by one or more spatial positioning sensors that are excluded from the portable computing device and that are disposed on-board the vehicle;

determining whether or not the one or more externally generated stimuli or conditions are indicative of the portable computing device being at least one of operated, held, or carried by one or more persons who are on-board the vehicle, including comparing the first set of values with a second set of values generated over time by one or more spatial positioning sensors included in the portable computing device;

granting access of the portable computing device to the on-board network, the granting based on a first determination that the one or more externally generated stimuli or conditions are indicative of the portable computing device being at least one of operated, held, or carried by the one or more persons who are on-board the vehicle, the first determination including a determination, based on the comparison, of a difference between the first set of values and the second set of values over time; and denying access of the portable computing device to the on-board network based on a second determination that the one or more externally generated stimuli or conditions are not indicative of the portable computing device being at least one of operated, held, or carried by any person who is on-board the vehicle, the second determination including a determination, based on the comparison, of a consistency between the first set of values and the second set of values over time.

2. The method of claim 1, further comprising presenting a particular challenge at the user interface of the portable computing device based on the second determination that the one or more externally generated stimuli or conditions are not indicative of the portable computing device being at least one of operated, held, or carried by a person who is on-board the vehicle; and one of:

granting access of the portable computing device to the on-board network upon a reception of a suitable response to the particular challenge; or denying access of the portable computing device to the on-board network upon (i) a reception of an unsuitable response to the particular challenge, or (ii) a failure to receive any response to the particular challenge within a time interval.

3. The method of claim 1, wherein determining whether or not the one or more externally generated stimuli or conditions are indicative of the portable computing device being at least one of operated, held, or carried by the one or more persons who are on-board the vehicle further comprises:

determining a confidence score based on more than one externally generated stimuli or conditions, the confidence score corresponding to the difference between the first set of values and the second set of values detected over an interval of time; and comparing the confidence score to a threshold.

4. The method of claim 1, wherein determining whether or not the one or more externally generated stimuli or conditions are indicative of the portable computing device being at least one of operated, held, or carried by the one or more persons who are on-board the vehicle further comprises at least one of:

obtaining an indication of an input received at the user interface or a manipulatable component of the portable computing device; or determining that data captured by an optical interface of the portable computing device while on-board the vehicle is at least one of: changing over time, including an image of at least a part of a person, or including an image of at least a part of the vehicle.

5. The method of claim 1, further comprising obtaining, at the portable computing device, respective indications of one or more signals that are generated by one or more devices fixedly connected to the vehicle; and wherein determining whether or not the one or more externally generated stimuli or conditions are indicative of the portable computing device being at least one of operated, held, or carried by the one or more persons who are on-board the vehicle is further based on the respective indications of the one or more signals.

6. The method of claim 5, wherein determining whether or not one or more externally generated stimuli or conditions are indicative of the portable computing device being at least one of operated, held, or carried by the one or more persons who are on-board the vehicle based on the respective indications of the one or more signals comprises at least one of:

comparing respective values of the one or more signals with a threshold corresponding to signal strength; or comparing the respective values of the one or more signals with user account data stored at the target computing device.

7. A system for averting unsanctioned access to a network on-board a vehicle, the network being an on-board network, and the system comprising a portable computing device having:

one or more wireless interfaces;

one or more processors; and one or more non-transitory, tangible memories storing computer-executable instructions thereon that, when executed by the one or more processors, cause the portable computing device to:

detect, based on a presence of a signal generated by the on-board network and received via the one or more wireless interfaces, that the portable computing device is on-board the vehicle;

detect, via the one or more wireless interfaces, one or more stimuli or conditions that are external to the portable computing device that is on-board the vehicle, the one or more externally generated stimuli or conditions excluding a response to a challenge issued at a user interface of the portable computing device and including a first set of values generated over time by one or more spatial positioning sensors that are excluded from the portable computing device and that are disposed on-board the vehicle;

determine whether or not the one or more externally generated stimuli or conditions are indicative of the portable computing device being at least one of operated, held, or carried by one or more persons who are on-board the vehicle, including comparing the first set of values with a second set of values generated over time by one or more spatial positioning sensors included in the portable computing device;

grant access of the portable computing device to the on-board network, the granting based on a first determination that the one or more externally generated stimuli or conditions are indicative of the portable computing device being at least one of operated, held, or carried by the one or more persons who are on-board the vehicle, the first determination, based on a difference between the first set of values and the second set of values over time indicated by the comparison; and deny access of the portable computing device to the on-board network based on a second determination that the one or more externally generated stimuli or conditions are not indicative of the portable computing device being operated, held, or carried by any person who is on-board the vehicle, the second determination based on a consistency between the first set of values and the second set of values over time indicated by the comparison.

8. The system of claim 7, wherein the computer executable instructions are executable to further cause the portable computing device to:

present a particular challenge at the user interface of the portable computing device based on the second determination that the one or more externally generated stimuli or conditions are not indicative of the portable computing device being at least one of operated, held, or carried by any person who is on-board the vehicle; and one of:
grant access of the portable computing device to the on-board network upon a reception of a suitable response to the particular challenge; or
deny access of the portable computing device to the on-board network upon (i) a reception of an unsuitable response to the particular challenge, or (ii) a failure to receive any response to the particular challenge within a time interval.

9. The system of claim 7, wherein the computer executable instructions to determine whether or not the one or more externally generated stimuli or conditions are indicative of the portable computing device being at least one of operated, held, or carried by the one or more persons who are on-board the vehicle include computer executable instructions that, when executed, cause the portable computing device to:

determine a confidence score based on more than one externally generated stimuli or conditions, the confidence score based on the difference between the first set of values and the second set of values detected over an interval of time; and compare the confidence score to a threshold.

10. The system of claim 7, wherein the determination of whether or not the one or more externally generated stimuli or conditions are contextual to the vehicle and are indicative of the portable computing device being utilized by the one or more persons who are on-board the vehicle is further based on at least one of:

a receipt of an indication of an ad-hoc input received at a user interface or a manipulatable component of the portable computing device; or a determination that data captured by an optical interface of the portable computing device while on-board the vehicle is at least one of: changing over time, including an image of at least a part of a person, or including an image of at least a part of the vehicle.

11. The system of claim 7,
wherein the computer-executable instructions are executable to further cause the system to obtain respective indications of one or more signals that are generated by one or more devices fixedly connected to the vehicle; and wherein the one or more externally generated stimuli or conditions correspond to the respective indications of the one or more signals that are generated by the one or more devices fixedly connected to the vehicle.

12. The system of claim 11, wherein the determination of whether or not one or more externally generated stimuli or conditions are indicative of the portable computing device being at least one of operated, held, or carried by the one or more persons who are on-board the vehicle is based on at least one of:

a comparison of respective values of the one or more signals generated by the one or more devices fixedly connected to the vehicle with a threshold, the threshold corresponding to signal strength; or a comparison of the respective values of the one or more signals generated by the one or more devices fixedly connected to the vehicle with user account data stored at the target computing device.

13. A system for averting unsanctioned access to a network on-board a vehicle, the network being an on-board network, and the system comprising a mobile computing device including:

one or more wireless interfaces via which the mobile computing device determines that the mobile computing device is on-board the vehicle;

a detection engine that is communicatively coupled to the one or more wireless interfaces of the mobile computing device that has been determined to be on-board the vehicle, the detection engine comprising a first set of computer-executable instructions that is stored on a non-transitory memory of the mobile computing device and that, when executed by a processor of the mobile computing device, causes the mobile computing device to detect, via the coupling to the one or more wireless interfaces, one or more stimuli or conditions that are external to the mobile computing device, the one or more stimuli or conditions that are external to the mobile computing device including a first set of values generated over time by one or more spatial positioning sensors that are excluded from the mobile computing device and that are disposed on-board the vehicle;

a determination engine coupled to the detection engine and comprising a second set of computer-executable instructions that is stored on the non-transitory memory of the mobile computing device and that, when executed by the processor of the mobile computing device, causes the mobile computing device to determine, based on the one or more stimuli or conditions detected by the detection engine, whether or not the mobile computing device is being at least one of operated, held, or carried by one or more persons who are on-board the vehicle, wherein:
- a grant or a denial of access of the mobile computing device to the on-board network is based on a determination of the determination engine;
- the determination of the determination engine includes a comparison of the first set of values and a second set of values generated over time by one or more spatial positioning sensors included in the mobile computing device; and
- a denial of access corresponds to a consistency over time between the first set of values and the second set of values, and a granting of access corresponds to a difference between the first set of values and the second set of values.

14. The system of claim 13, wherein the one or more wireless interfaces communicatively couple the mobile computing device to one or more other devices fixedly connected to the vehicle, and wherein the determination of whether or not the mobile computing device is being at least one of operated, held, or carried by the one or more persons is further based on at least one of a respective content or a respective strengths of one or more wireless signals that are (i) generated by one or more other devices fixedly connected to the vehicle, and (ii) received at the mobile computing device via the one or more wireless interfaces.

15. The system of claim 13, wherein the one or more components of the mobile computing device include at least one of a user interface or an optical interface via which ad-hoc data is received, and wherein the one or more stimuli or conditions are further based on the received, ad-hoc data.

16. The system of claim 13, wherein the processor of the mobile computing device is triggered to execute the first set of computer-executable instructions upon at least one of:
- an initialization of the mobile computing device;
- an initialization of a web browser at the mobile computing device;
- an initialization of a first application in which the first set of computer-executable instructions is included;
- an initialization of a second application at the mobile computing device; or
- a detection, at the mobile computing device, of a wireless signal transmitted by a device that is fixedly connected to the vehicle.

\* \* \* \* \*